(12) United States Patent
Andersson

(10) Patent No.: US 10,844,906 B2
(45) Date of Patent: *Nov. 24, 2020

(54) SOFA BED, AND A SOFA BED SLIDING SYSTEM FOR SUCH SOFA BED

(71) Applicant: IKEA Supply AG, Pratteln (CH)

(72) Inventor: Benny Andersson, Älmhult (SE)

(73) Assignee: IKEA SUPPLY AG, Pratteln (CH)

( * ) Notice: Subject to any disclaimer, the term of this patent is extended or adjusted under 35 U.S.C. 154(b) by 295 days.

This patent is subject to a terminal disclaimer.

(21) Appl. No.: 15/757,538

(22) PCT Filed: Sep. 7, 2016

(86) PCT No.: PCT/SE2016/050837
§ 371 (c)(1),
(2) Date: Mar. 5, 2018

(87) PCT Pub. No.: WO2017/044034
PCT Pub. Date: Mar. 16, 2017

(65) Prior Publication Data
US 2018/0335082 A1    Nov. 22, 2018

(30) Foreign Application Priority Data

Sep. 7, 2015  (SE) .......................... 1551138
Jul. 13, 2016  (SE) .......................... 1651049
(Continued)

(51) Int. Cl.
*F16C 33/20*    (2006.01)
*F16C 29/02*    (2006.01)
(Continued)

(52) U.S. Cl.
CPC ........ *F16C 33/203* (2013.01); *A47C 17/1655* (2013.01); *B32B 15/08* (2013.01);
(Continued)

(58) Field of Classification Search
CPC ...... F16C 33/203; F16C 33/201; F16C 29/02; F16C 2314/70; B32B 15/08;
(Continued)

(56) References Cited

U.S. PATENT DOCUMENTS 1,071,006 A    8/1913   Little
2,441,721 A    5/1948   Schroeder
(Continued)

FOREIGN PATENT DOCUMENTS

CA    2 437 147 A1    2/2005
CH    334 983 A       12/1958
(Continued)

OTHER PUBLICATIONS

Štěpek et al. Additives for Plastics, Polymers Properties and Applications 5, Prague and Montreal, Dec. 1982.
(Continued)

*Primary Examiner* — Myles A Throop
(74) *Attorney, Agent, or Firm* — Renner, Otto, Boisselle & Sklar, LLP

(57) ABSTRACT

A sofa bed sliding system for a sofa bed is provided. The sliding system is forming a connection between a moveable sofa bed part and an associated frame structure, wherein said sliding system includes at least one sliding surface being coated with a lacquer including a resin, wherein said lacquer in turn is at least partly coated with a lipophilic composition coating to provide a slide layer with a lowered friction.

21 Claims, 17 Drawing Sheets

(30) Foreign Application Priority Data

| Jul. 25, 2016 | (SE) | 1651084 |
|---|---|---|
| Jul. 25, 2016 | (SE) | 1651085 |

(51) Int. Cl.

| A47C 17/165 | (2006.01) |
|---|---|
| C25D 11/04 | (2006.01) |
| C25D 13/22 | (2006.01) |
| B32B 15/08 | (2006.01) |
| C09D 133/06 | (2006.01) |
| C10M 101/02 | (2006.01) |
| C10M 129/40 | (2006.01) |
| C10M 129/95 | (2006.01) |
| C10M 169/04 | (2006.01) |
| C25D 13/04 | (2006.01) |
| C25D 13/12 | (2006.01) |
| C09D 133/08 | (2006.01) |
| C10N 50/00 | (2006.01) |

(52) U.S. Cl.
CPC ......... *C09D 133/06* (2013.01); *C10M 101/02* (2013.01); *C10M 129/40* (2013.01); *C10M 129/95* (2013.01); *C10M 169/04* (2013.01); *C25D 11/04* (2013.01); *C25D 13/04* (2013.01); *C25D 13/12* (2013.01); *C25D 13/22* (2013.01); *F16C 29/02* (2013.01); *F16C 33/201* (2013.01); *C09D 133/08* (2013.01); *C10M 2203/1025* (2013.01); *C10M 2207/281* (2013.01); *C10M 2207/34* (2013.01); *C10N 2050/025* (2020.05); *F16C 2314/70* (2013.01)

(58) Field of Classification Search
CPC .. C09D 133/06; C09D 133/08; C10M 101/02; C10M 129/40; C10M 129/95; C10M 169/04; C10M 2203/1025; C10M 2207/281; C10M 2207/34; C25D 13/04; C25D 13/12; C25D 11/04; C25D 13/22; A47C 17/1655; A47C 17/13; C10N 2250/141

See application file for complete search history.

(56) References Cited

U.S. PATENT DOCUMENTS

| 2,720,316 | A | | 10/1955 | Glascott |
|---|---|---|---|---|
| 3,139,313 | A | | 6/1964 | Rule |
| 3,221,677 | A | | 12/1965 | Kerr |
| 3,622,473 | A | | 11/1971 | Ohta et al. |
| 3,755,093 | A | | 8/1973 | Suematsu |
| 3,760,744 | A | | 9/1973 | Cruckshank |
| 3,916,802 | A | | 11/1975 | Virtue |
| 4,036,369 | A | | 7/1977 | Eisenberg |
| 4,138,176 | A | | 2/1979 | Cowdroy |
| 4,286,525 | A | | 9/1981 | Willmore |
| 4,297,952 | A | | 11/1981 | Zagaroli |
| 4,500,146 | A | | 2/1985 | Peterson |
| 4,637,081 | A | | 1/1987 | Clark |
| 4,713,949 | A | | 12/1987 | Wilcox |
| 5,064,547 | A | * | 11/1991 | Rubin ................ C10M 111/00 508/440 |
| 5,085,524 | A | * | 2/1992 | Reiss, Jr. .............. A47B 1/10 108/83 |
| 5,101,524 | A | * | 4/1992 | Brandschain ...... A47C 17/134 5/17 |
| 5,263,384 | A | | 11/1993 | Suzuki |
| 5,290,058 | A | | 3/1994 | Adams et al. |
| 5,735,610 | A | * | 4/1998 | Mark ................... F16C 29/02 384/41 |
| 6,004,909 | A | | 12/1999 | Lindman |
| 6,520,092 | B2 | | 2/2003 | Marshall |
| 6,854,402 | B2 | | 2/2005 | Dubarry |
| 6,855,676 | B2 | | 2/2005 | Li |
| 6,877,826 | B2 | | 4/2005 | Wood |
| 7,398,737 | B1 | | 7/2008 | Martellaro |
| 7,653,966 | B2 | | 2/2010 | Quinn |
| 7,780,254 | B2 | | 8/2010 | Wang |
| 7,987,799 | B2 | | 8/2011 | Lange |
| 8,418,318 | B2 | | 4/2013 | Scharf et al. |
| 10,077,934 | B1 | | 9/2018 | Dizon |
| 10,441,069 | B2 | * | 10/2019 | Andersson ............ A47B 1/10 |
| 2003/0013615 | A1 | * | 1/2003 | Levy ................. C10M 111/04 508/113 |
| 2003/0213698 | A1 | * | 11/2003 | Kawagoshi ........... C23C 28/00 205/201 |
| 2004/0096129 | A1 | | 5/2004 | Schmalzhofer |
| 2007/0261198 | A1 | | 11/2007 | Vogler |
| 2008/0125338 | A1 | | 5/2008 | Corbett et al. |
| 2008/0159671 | A1 | * | 7/2008 | Leonardelli ............ B05D 5/08 384/129 |
| 2011/0177987 | A1 | | 7/2011 | Lentig |
| 2014/0208654 | A1 | | 7/2014 | Anderson |
| 2014/0255656 | A1 | | 9/2014 | Suzuki et al. |
| 2015/0361274 | A1 | * | 12/2015 | Domes ................... C09D 4/00 427/515 |
| 2016/0106221 | A1 | | 4/2016 | Gardner |
| 2016/0319211 | A1 | * | 11/2016 | Barth ................... C09D 161/06 |
| 2020/0003258 | A1 | * | 1/2020 | Andersson ............ B32B 15/08 |
| 2020/0071631 | A1 | * | 3/2020 | Andersson ........... C10M 101/02 |

FOREIGN PATENT DOCUMENTS

| CN | 101035959 | A | 9/2007 |
|---|---|---|---|
| CN | 201190490 | U | 2/2009 |
| CN | 201230725 | U | 5/2009 |
| CN | 201491997 | U | 6/2010 |
| CN | 102307499 | A | 1/2012 |
| CN | 202436824 | U | 9/2012 |
| CN | 103555177 | A | 2/2014 |
| CN | 103573075 | A | 2/2014 |
| CN | 104154118 | A | 11/2014 |
| DE | 1112266 | B | 8/1961 |
| DE | 1954506 | | 2/1967 |
| DE | 3613313 | A1 | 10/1987 |
| DE | 29611949 | U1 | 9/1996 |
| DE | 29813478 | U1 | 11/1998 |
| DE | 20111930 | U1 | 10/2001 |
| DE | 10 2011 053 946 | A1 | 3/2013 |
| FR | 1467583 | A | 1/1967 |
| GB | 1126855 | A | 9/1968 |
| GB | 1383645 | | 2/1975 |
| GB | 1415100 | A | 11/1975 |
| GB | 2 386 929 | A | 10/2003 |
| JP | 576447 | | 3/1993 |
| JP | 2003268194 | | 9/2003 |
| JP | 2006-062328 | A | 3/2006 |
| WO | 1999047824 | A1 | 9/1999 |
| WO | 2006022669 | A1 | 3/2006 |
| WO | 2015051892 | A1 | 4/2015 |
| WO | 2017042201 | A1 | 3/2017 |
| WO | 2017042203 | A1 | 3/2017 |
| WO | 2017042228 | A1 | 3/2017 |
| WO | 2017044032 | A1 | 3/2017 |

OTHER PUBLICATIONS

Hussein et al., "Enhancement of the Wear Resistance and Microhardness of Aluminum Alloy by Nd:YaG Laser Treatment," The Scientific World Journal, , vol. 2014,Article ID 842062, pp. 1-5.

Table of Aluminum hardnesses—Nov. 29, 2019 (Year:2019).

Loehle et al. "Mixed Lubrication with C18 Fatty Acids: Effect of Unsaturation", Tribology Letters, 2014, vol. 53, pp. 319-328.

Greenlaw, "I use coconut oil instead of a spray lubricant as much as possible, especially near food", Pi nterest 11I , 'Nov. 1, 2014 (Nov. 1, 2014)' XP055315462, Retrieved from the Internet: URL:https:jjnl.pinterest.com/pin/395331673512857041/[retrieved on 20:1.6-11-01].

(56) References Cited

OTHER PUBLICATIONS

International Search Report and Written Opinion for copending International Application No. PCT/EP2016/071065—dated Nov. 14, 2011.
International Preliminary Report on Patentability copending International Application No. PCT/EP2016/071065 dated Oct. 12, 2017.
International Search Report and Written Opinion for copending International Application No. PCT/EP2016/071104 dated Nov. 16, 2011.
International Preliminary Report on Patentability copending International Application No. PCT/EP2016/071104 dated Oct. 12, 2017.
International Search Report and Written Opinion for corresponding International Application No. PCT/SE2016/050837 dated Nov. 23, 2016.
International Preliminary Report on Patentability corresponding International Application No. PCT/SE2016/050837 dated Oct. 13, 2017.
International Search Report and Written Opinion for copending International Application No. PCT/SE2016/050835 dated Nov. 23, 2016.
International Search Report and Written Opinion for copending International Application No. PCT/EP2016/071059 dated Dec. 5, 2016.

\* cited by examiner

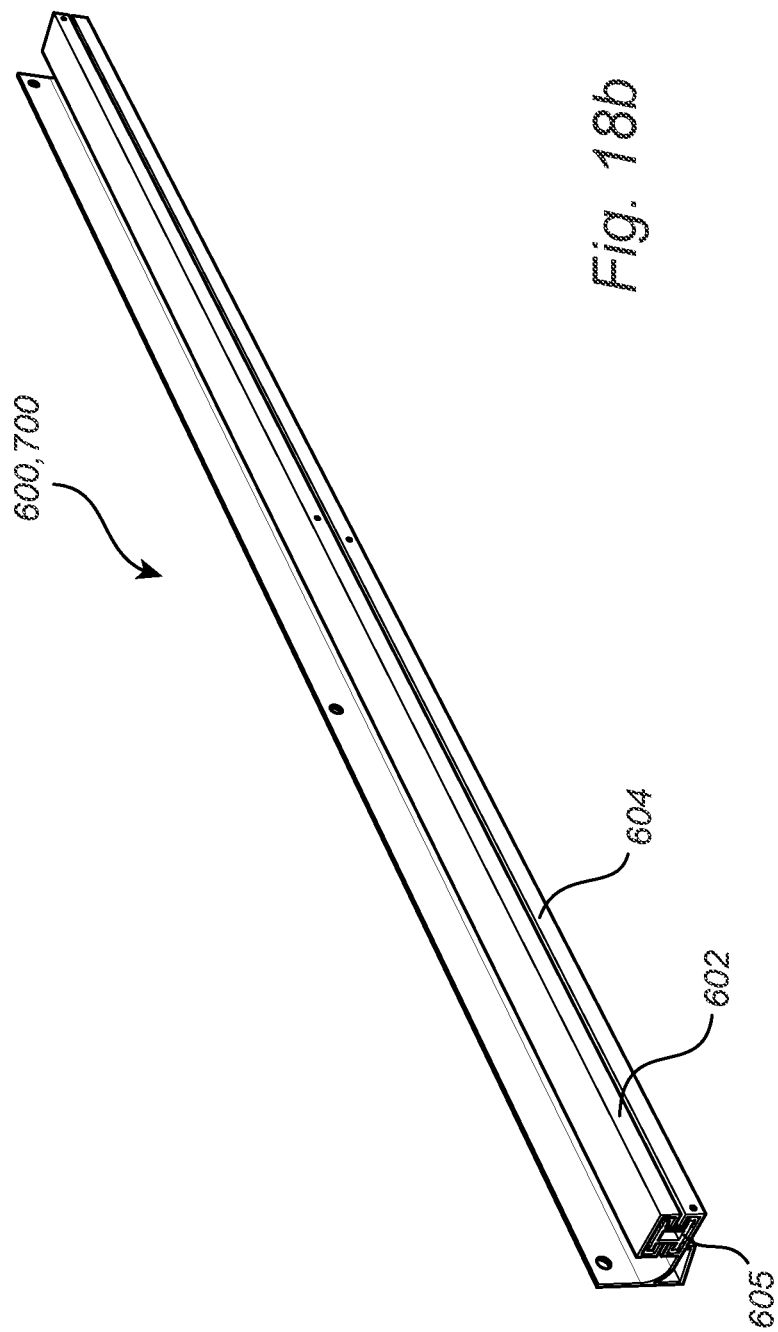

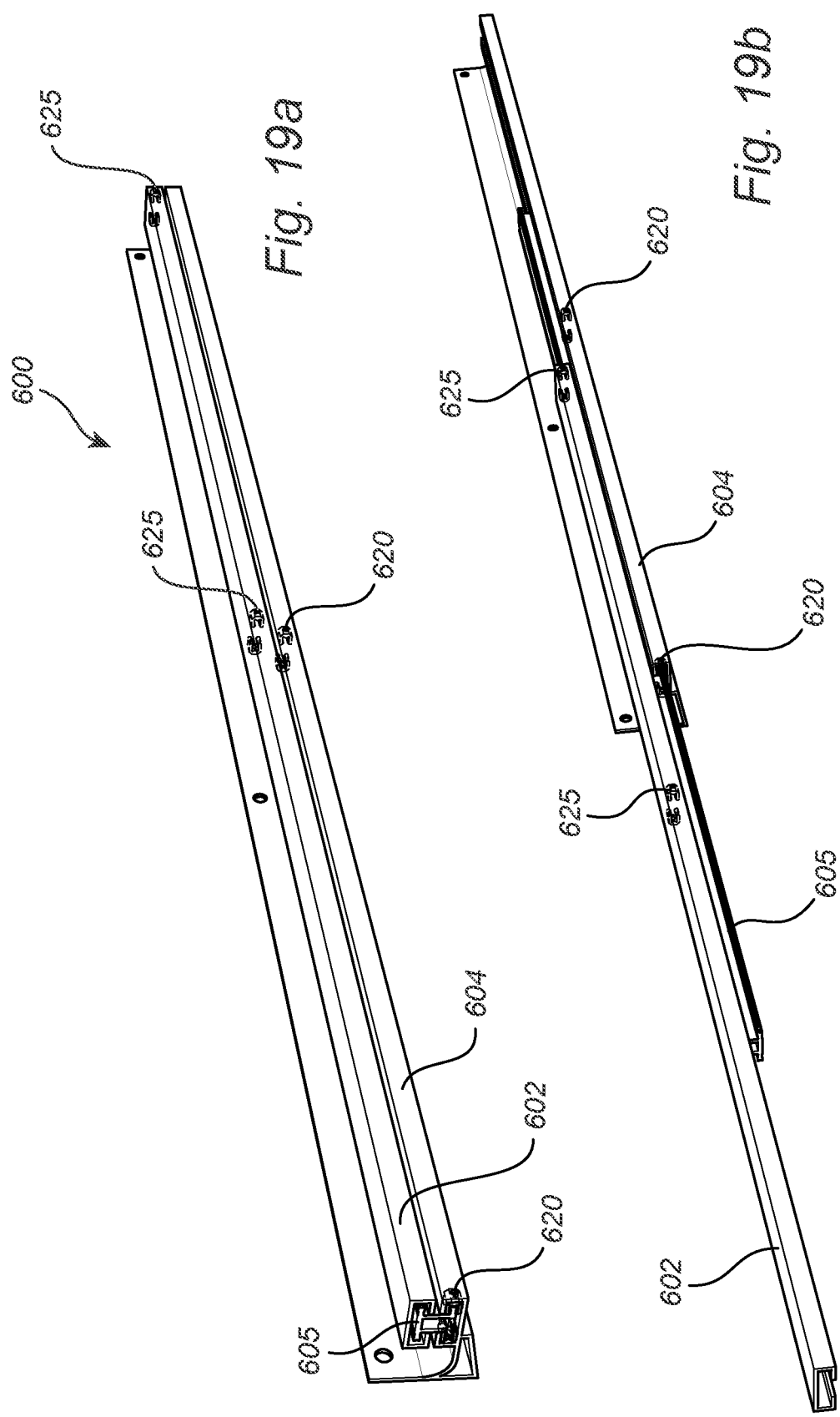

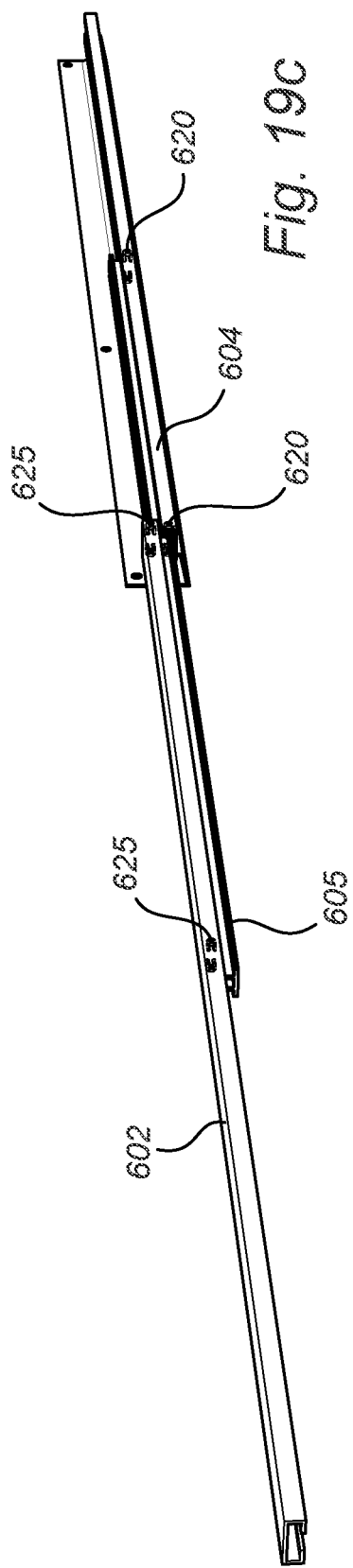

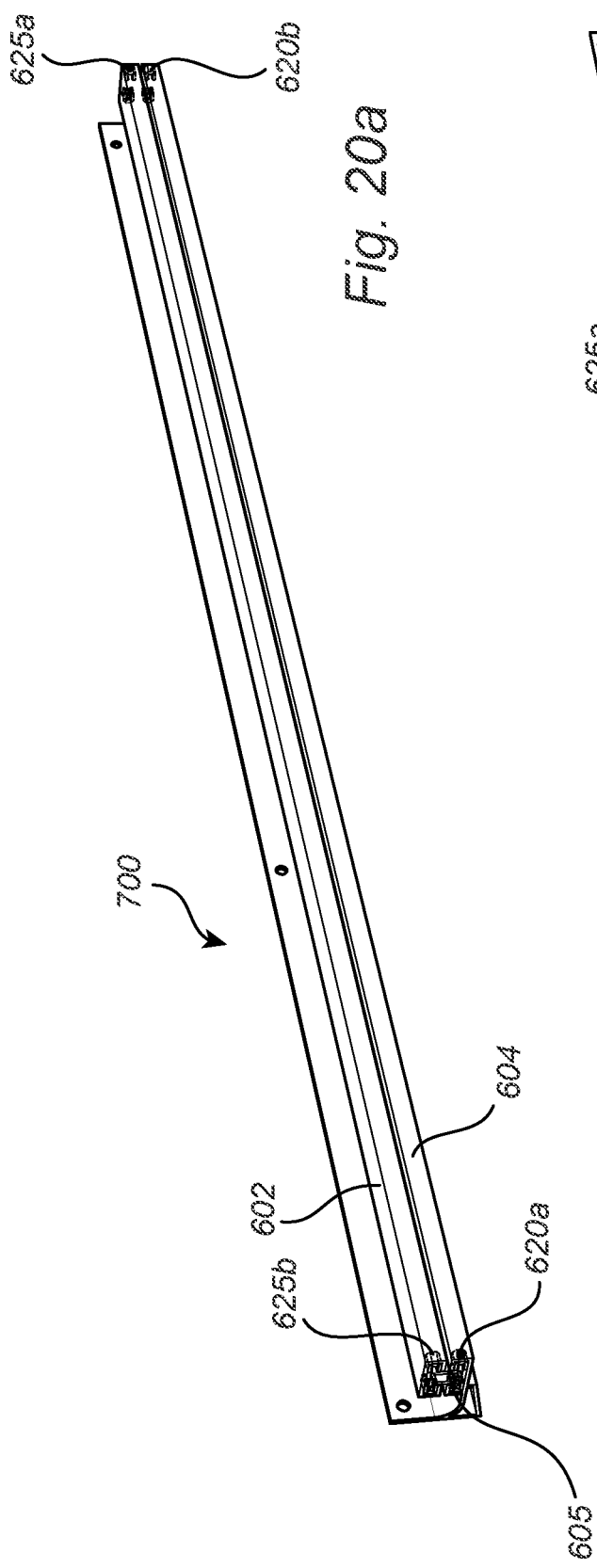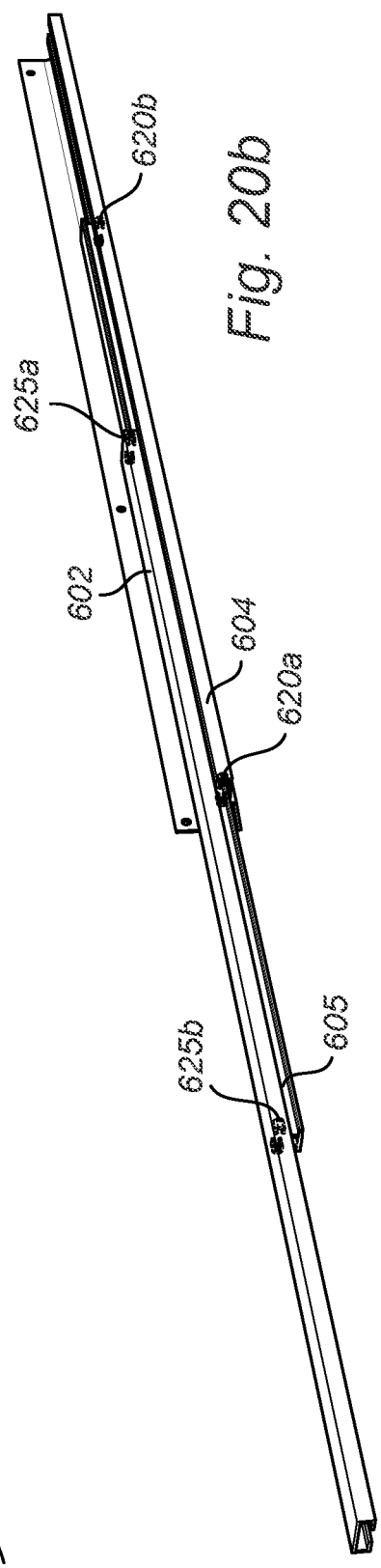

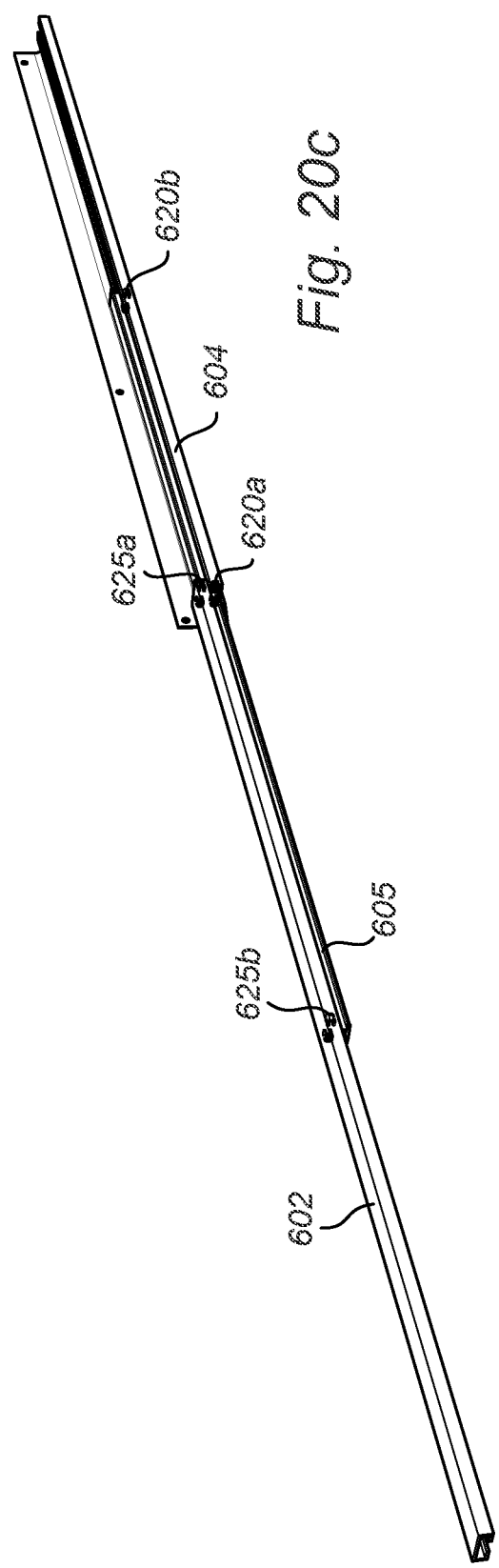

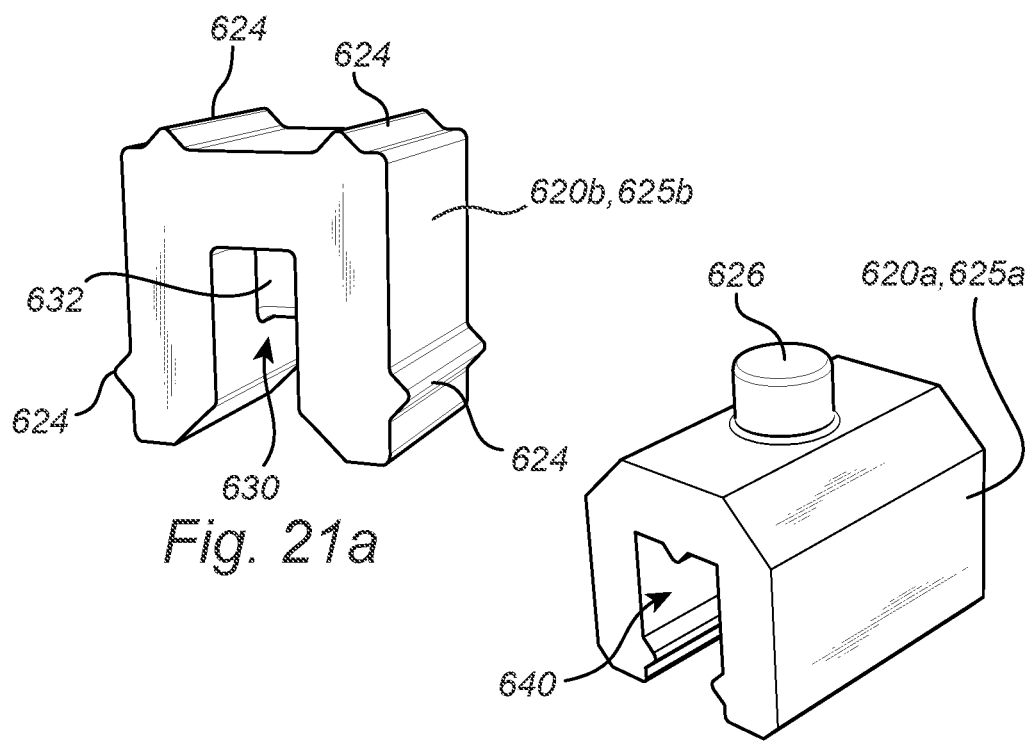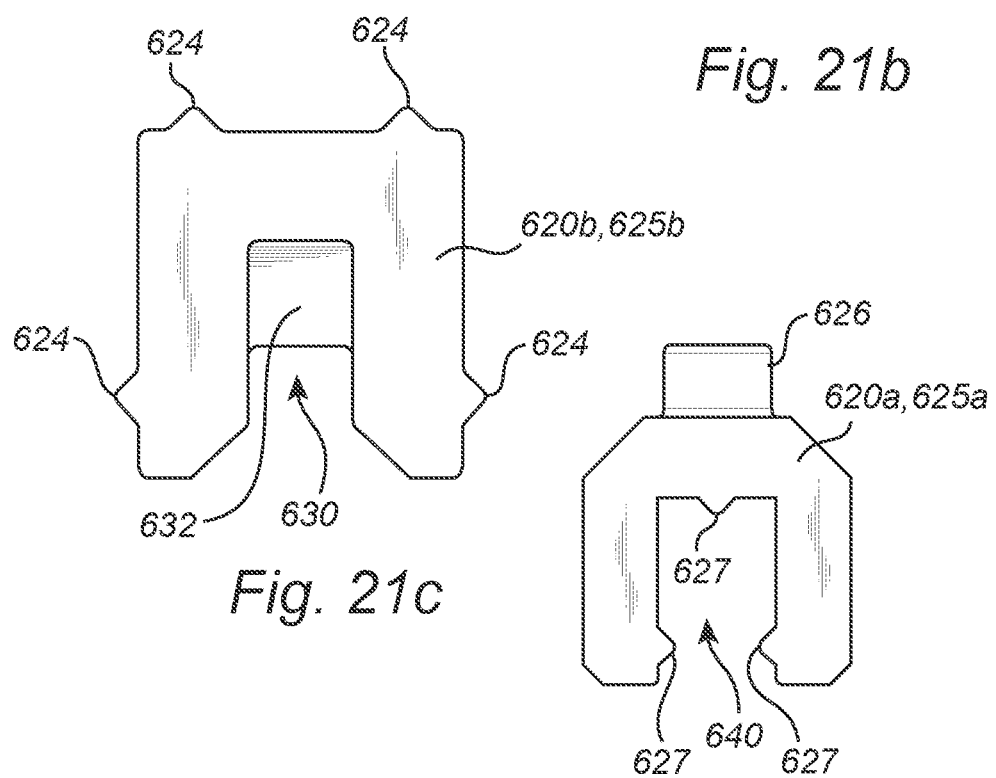

SOFA BED, AND A SOFA BED SLIDING SYSTEM FOR SUCH SOFA BED

This application is a national phase of International Application No. PCT/SE2016/050837 filed Sep. 7, 2016, and claims priority to Swedish Application No. 1551138-9 filed on Sep. 7, 2015, Swedish Application No. 1651049-7 filed on Jul. 13, 2016, Swedish Application No. 1651085-1 filed on Jul. 25, 2016 and Swedish Application No. 1651084-4 filed on Jul. 25, 2016, which are incorporated herein by reference.

TECHNICAL FIELD

The present invention relates to a sofa bed. More particularly the present invention relates to a sofa bed sliding system adapted for use with a sofa bed, as well as a sofa bed having such sofa bed sliding system.

BACKGROUND

Sofa beds have existed for a long time and various techniques have been suggested in order to provide for a robust, yet easily maneuverable, solution allowing the sofa bed to be extended from a sofa position to a bed position, and vice versa.

A sofa bed typically includes a fixed frame structure, and one or more parts being moveable relative the fixed frame structure. For example, the fixed frame structure may define two opposite armrests and a support structure arranged in between the armrests. A seating portion, which forms the seating area when the sofa bed is in the sofa position, may be moveable relative the fixed frame structure such that it can be pulled out, thus revealing the underlying support structure. When the seating portion has reached its extended end position the backrest may be folded downwards to cover the revealed support structure. The folded backrest and the extended seating portion will form a bed area.

For a smooth movement of the seating portion it has been suggested to provide the fixed frame structure with a horizontal guiding rail, e.g. in the form of a linear wooden protrusion. Each side of the seating area is provided with one or more rollers engaging with the upper surface of the guiding rail, whereby not only a low friction is ensured, but also it is possible to add stop members such that the seating area does not move beyond its extended end position. Such solutions are well known within the technical area, but they all share the same drawback that rather expensive components, i.e. guiding rails, bearings, and low friction rollers, are required to provide the desired functionality.

In view of the problem mentioned there is a need for an improved sofa bed sliding system for a sofa bed which allows for a simple and cost effective structure and manufacturing, while still allowing for easy and robust operation.

SUMMARY

An object of the present invention is to provide a sofa bed sliding system for a sofa bed overcoming the above mentioned drawbacks of prior art and at least partly solving the problems associated with the prior art systems.

This object is achieved by utilizing a novel concept for sofa bed sliding systems, and to provide a sofa bed operating according to this concept. The novel concept is based on the principle of having a sliding surface with very low sliding friction. The sliding surface is coated with a lacquer comprising a resin. The lacquer is in turn at least partly coated with a lipophilic composition coating to provide a slide layer with lowered friction. The sliding surface may for example be formed on an aluminum bar, e.g. aluminum profile, preferably having an anodized oxide surface layer, onto which the lacquer is applied. As an example, the surface may be formed on a linear, aluminum profile having been electrophoretically, preferably anaphoretically coated with an acrylic resin and subsequently heat cured to form the lacquer coated on the slide surface. Preferably, the aluminum profile has an anodized oxide surface layer onto which the lacquer is applied. The Honny process or one of its derivatives may be used to obtain such anodized, lacquered surfaces. Whereas the thickness of the anodized oxide surface layer preferably is at least 5 micrometers, the thickness of the lacquer coated on the slide bar may preferably be 100 micrometers or less. The lipophilic composition coating typically comprises compounds comprising C6 to C40, such as C8 to C30, non-aromatic hydrocarbyl groups, such as alkenyl groups and/or alkyl groups, e.g. alkyl groups.

According to another embodiment the slide surface of the slide member is made from steel, onto which the lacquer is applied. Steel is a generally strong, hard and comparably cheap material that can be used as a starting material for the slide member. Steel surfaces may be lacquered by electrocoating or autodeposition to provide a lacquer layer with uniform thickness.

The linear slide bar is arranged to be in sliding engagement with at least one sliding member. The interface between the slide layer of the slide bar and the sliding member forms a linear plain bearing to allow for linear movement of the sliding member along the longitudinal axis of the linear slide bar. The part of said sliding member to slide over the slide layer may be configured as a blade extending in the sliding direction. Further, the slide layer may be present in a groove extending along the longitudinal axis of the slide bar. The sliding member comprises at least one individual contact point in contact with the slide bar at the interface between the slide bar and the sliding member. The contact area of each individual contact point may be less than 3 mm2. Further, the contact pressure in the at least one contact point may be at least 4 N/mm2.

According to a first aspect of the invention, a sofa bed sliding system for a sofa bed is provided. The sofa bed sliding system forms a connection between a moveable sofa bed part and an associated frame structure. The sliding system comprises at least one sliding surface being coated with a lacquer comprising a resin, wherein said lacquer in turn is at least partly coated with a lipophilic composition coating to provide a slide layer with a lowered friction.

The sliding surface may preferably be provided on a rigid member having a fastening arrangement adapted for connection to one of said moveable sofa bed part and the frame structure being moveable relative each other for allowing linear movement of said moveable sofa bed part/frame structure along a longitudinal axis.

In an embodiment the sliding surface is made from a material having a Vickers hardness of at least 50 MPa, preferably at least 100 MPa, more preferably at least 150 MPa, such as metal or glass, preferably the material is a metal.

The sliding surface may be made of aluminum and/or steel.

The sliding surface may be made of aluminum, e.g. a linear aluminum profile, having a surface layer onto which the lacquer is applied, preferably the aluminum having an anodized oxide surface layer, preferably the thickness of the anodized oxide surface layer is at least 5 micrometers, more preferably at least 10 micrometers.

The sliding surface may be formed by an insert received in a recess in one of said moveable sofa bed part and said frame structure.

The part being provided with the recess may be made of a material being different from the material of said insert.

The material of the part being provided with the recess may be a wooden material, a metal material, or a plastic material.

The sliding surface may be integrally formed in one of said moveable sofa bed part and said frame structure, preferably the sliding surface is formed by a C-shaped groove.

The sliding surface may be formed by a member protruding outwards from one of said moveable sofa bed part and said frame structure.

The sliding surface may be formed by at least one of an upper sliding surface, a lower sliding surface, and a distal sliding surface, or any combination thereof.

The sliding surface may be formed by an intermediate slide bar providing a sliding movement in relation to at least one guiding rail, said guiding rail being connected to one of said moveable sofa bed part and said frame structure.

The resin of the lacquer may comprise polar groups, such as hydroxyl groups, carboxylic acid groups, amide groups, cyano groups (nitrile groups), halide groups, sulfide groups, carbamate groups, aldehyde groups, and/or ketone groups.

The resin of the lacquer may be a thermosetting resin.

The resin of the lacquer may be selected from the group consisting of: acrylic resins, acrylate resins, acrylamide resins, methacrylate resins, methyl metachrylate resins, acrylonitrile resins, styrene-acrylonitril resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins.

The resin of the lacquer may be an acrylic resin, such as an acrylate resin, an acrylamide resin, a methacrylate resin, or a methyl metachrylate resin and mixtures thereof.

The thickness of the lacquer coated on the sliding surface may be 100 μm or less, preferably 75 μm or less, more preferably 5 to 75 μm, even more preferably 50 μm or less, still more preferably 10 to 50 μm, and yet more preferably 15 to 40 μm.

The sliding surface may have been lacquered by electrocoating or autodeposition, e.g. by Autophoretic™ deposition, in a bath containing the lacquer or by electrostatic coating with a powder lacquer, or by wet spraying with a liquid lacquer; preferably the sliding surface has been lacquered by electrocoating in a bath containing the lacquer or by electrostatic coating with a powder lacquer.

The sliding surface may be formed by an aluminum member, e.g. an aluminum profile, preferably having an anodized oxide surface layer onto which the lacquer is applied, preferably the thickness of the anodized oxide surface layer is at least 5 micrometers, more preferably at least 10 micrometers, and wherein the surface layer has been electrophoretically, such as anaphoretically, coated with a resin, such as an acrylic resin, and subsequently heat cured to form the lacquer coated on the sliding surface, preferably the sliding surface has been coated using the Honny process or one of its derivatives.

The lipophilic composition coating may comprise compounds comprising C6 to C40, such as C8 to C30, or even C10 to C24, non-aromatic hydrocarbyl groups, such as alkenyl groups and/or alkyl groups, e.g. alkyl groups.

The lipophilic composition coating present on the lacquer may comprise at least 25 wt. %, such as at least 50 wt. %, of compounds comprising C6 to C40, such as C8 to C30, alkyl groups.

The lipophilic composition coating present on the lacquer may comprise at least 25 wt. %, such as at least 50 wt. %, C6 to C40, such as C8 to C30, non-aromatic hydrocarbons, such as alkenes and/or alkanes, e.g. alkanes.

The lipophilic composition coating present on the lacquer may comprise triglycerides and/or fatty acids; preferably said triglycerides, if present, comprises at least 75% saturated fatty acid residues and said fatty acids, if present, comprises at least 75% saturated fatty acids.

The lipophilic composition coating present on the lacquer may comprise 1 to 40 wt. % triglycerides and/or fatty acids, preferably said triglycerides, if present, being composed of fatty acids with C6 to C40, such as C8 to C30, alkyl groups, and preferably said fatty acids, if present, having C6 to C40, such as C8 to C30, alkyl groups.

The lipophilic composition coating present on the lacquer may comprise at least 25 wt. %, such as at least 50 wt. %, of triglycerides and/or fatty acids, preferably said triglycerides, if present, being composed of fatty acids with C6 to C40, such as C8 to C30, alkyl groups, and preferably said fatty acids, if present, having C6 to C40, such as C8 to C30, alkyl groups.

The sofa bed sliding system may further comprise at least one sliding member for engagement with said sliding surface, and wherein the interface between the sliding surface and the at least one sliding member forms a linear plain bearing to allow for linear movement of the sliding member along the longitudinal axis of the sliding surface.

At least the part of said at least one sliding member being in contact with the sliding surface may be made of a plastic, preferably a plastic comprising a polymer with polar groups, more preferably the polar groups are selected from the group consisting of hydroxyl groups, carboxylic acid groups, amide groups, halide groups, sulfide groups, cyano groups (nitrile groups), carbamate groups, aldehyde groups, and/or ketone groups.

At least the part of said at least one sliding member in contact with the sliding surface may be made of a plastic comprising a polymer selected from the group of polymers consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE).

The at least one sliding member may in its entirety be made from a plastic.

The part of said at least one sliding member to slide over the sliding surface may be configured as at least one blade extending in the sliding direction, preferably the sliding surface is present on a guiding rail being connected to one of said moveable sofa bed part and said frame structure, preferably the length of the blade, as seen along the sliding direction of the guiding rail, being 2-50 mm, more preferably 5-30 mm.

The at least one sliding member may comprise at least one individual contact point in contact with the sliding surface, the contact area of each individual contact point being less than 3 mm², more preferably less than 1.5 mm², and most preferably less than 0.75 mm².

The at least one sliding member may comprise at least one contact point at which contact is made between the sliding member and the sliding surface, wherein the contact pressure in said at least one contact point is at least 4 N/mm², preferably at least 8 N/mm², and more preferably at least 12 N/mm², and wherein preferably the contact pressure is lower than the strain at yield of the material of the sliding member at the contact point.

The sofa bed sliding system may further comprise a first guiding rail being attached to the moveable sofa bed part, and a second guiding rail being attached to the frame structure The sofa bed sliding system may further comprise an intermediate slide bar being movable relative to the first and second guiding rails.

The intermediate slide bar may be provided with a first sliding surface being in sliding contact with a first slide member on the first guide rail and a second sliding surface being in sliding contact with a second slide member on the second guide rail, and/or is provided with a first slide member being in sliding contact with a first sliding surface on the first guide rail and a second sliding member being in sliding contact with a second sliding surface on the second guiding rail.

A guiding rail being provided with the sliding surface may be connected to one of said moveable sofa bed part and said frame structure, the other of said moveable sofa bed part and said frame structure being provided with the slide member, wherein the guiding rail is preferably provided with a groove receiving the slide member, the sliding surface being provided inside said groove, preferably both the upper and lower edges of the groove being provided with respective sliding surfaces being in sliding contact with upper and lower parts of the slide member.

According to a second aspect, a sofa bed is provided and comprising at least one sofa bed sliding system according to the first aspect.

The sofa bed may comprise a sliding surface connected to one of said moveable sofa bed part and said frame structure and at least one sliding member connected to the other one of said moveable sofa bed part and said frame structure, and wherein the interface between the sliding surface and the at least one sliding member forms a linear plain bearing to allow for movement of said sofa bed part relative to said frame structure.

The sofa bed may comprise a first guiding rail being connected to the moveable sofa bed part, and a second guiding rail being connected to the frame structure, preferably at least one sliding surface being arranged on one of the first and second guiding rails, and at least one slide member being arranged on the other of the first and second guiding rails.

The sofa bed may comprise a first sliding system supporting one lateral side of the moveable sofa bed part, and a second sliding system supporting the opposite lateral side of the moveable sofa bed part.

BRIEF DESCRIPTION OF DRAWINGS

The invention will be described in further detail below under reference to the accompanying drawings, in which

FIG. 6b is an isometric view of parts of the sofa bed sliding system shown in FIG. 6a;

FIG. 11b is a cross-sectional view of a sofa bed sliding system according to an embodiment, utilizing the part shown in FIG. 11a;

FIG. 18b is an isometric view of the sofa bed sliding system shown in FIG. 18a;

FIGS. 19a-c are isometric views of a sofa bed sliding system according to an embodiment shown in different operational states;

FIGS. 20a-c are isometric views of a sofa bed sliding system according to another embodiment shown in different operational states; and FIGS. 21a-d are isometric views of sliding system parts of the sofa bed sliding system shown in FIG. 18a.

DETAILED DESCRIPTION

Figure 1:
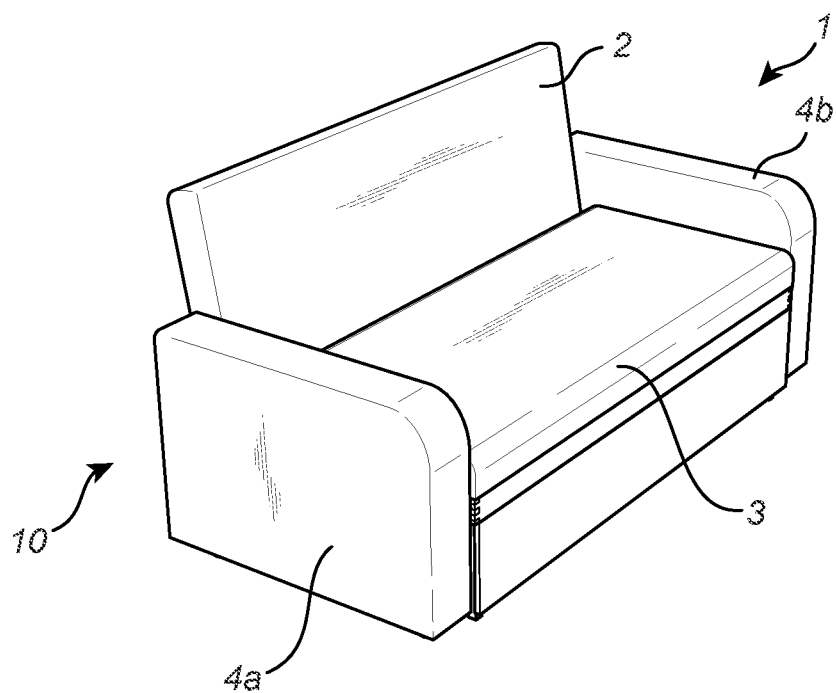
FIG. 1 is an isometric view of a sofa bed.
Figure 2:
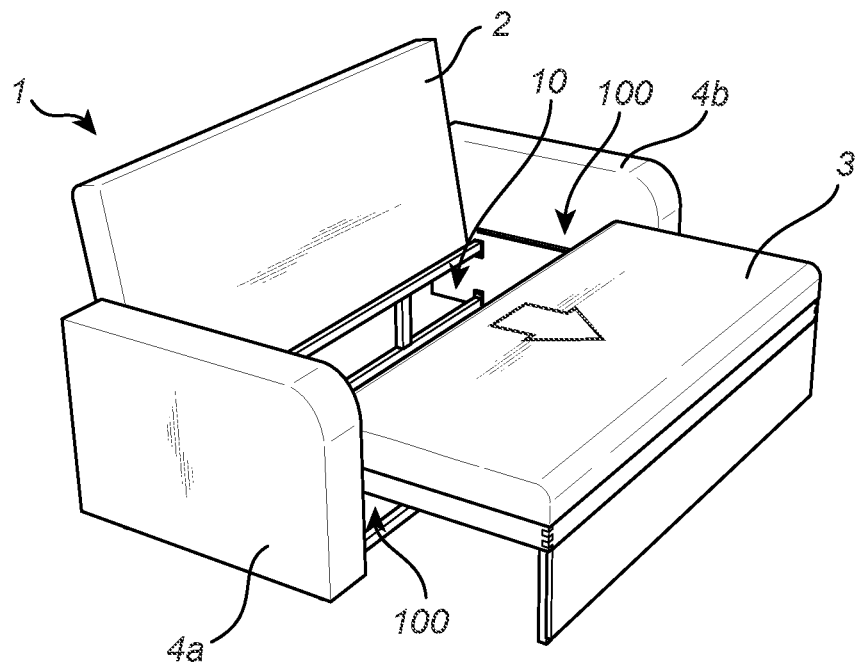
FIG. 2 is an isometric view of the sofa bed shown in FIG. 1, here shown in an intermediate state between a sofa position and a bed position.
Figure 3:
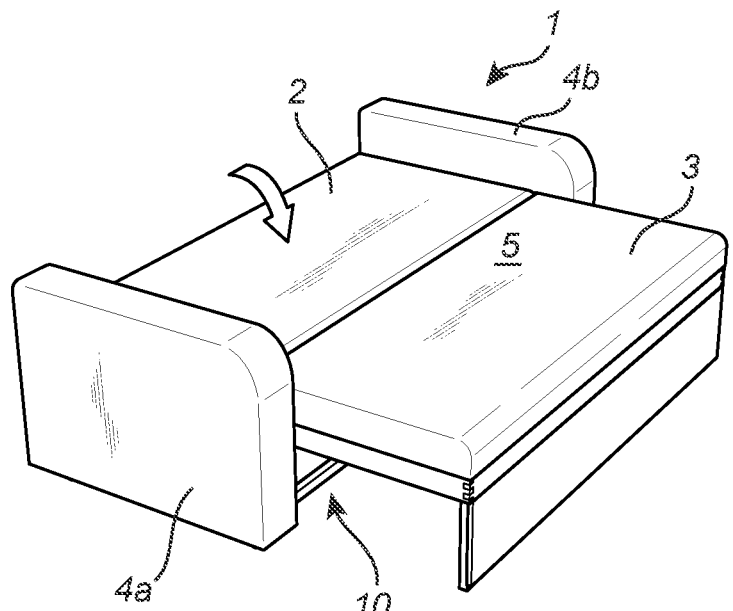
FIG. 3 is an isometric view of the sofa bed shown in FIG. 1, here shown in a bed position.

A sofa bed 1 is schematically shown in FIGS. 1-3. The sofa bed 1 includes a backrest 2, a seat 3, and armrests 4a, 4b. In the shown example the arm rests 4a-b form part of a fixed frame structure 10 (shown in further details in FIG. 5), and the seat 3 and the back rest 2 are moveable relative the fixed frame structure in order to change the sofa bed from a sofa position, as is shown in FIG. 1, to a bed position as is shown in FIG. 3.

In FIG. 1 the sofa bed 1 is shown in a sofa position, i.e. in a position in which the seat 3 is maintained in its innermost position. In FIG. 2 the functionality of the sofa bed 1 is shown, whereby the seat 3 has been drawn out from its sofa position in a horizontal direction. The movement of the seat 3 is enabled by the provision of at least one sofa bed sliding system 100. In this embodiment the sofa bed 1 is provided with one sofa bed sliding system 100 at each side of the sofa bed 1, to connect the seat 3 to both sides of the fixed frame structure 10.

For the embodiment of the sofa bed 1 shown in FIGS. 1-3 each sofa bed sliding system 100 forms a sliding connection between the seat 3 and the fixed frame structure 10. In an alternative embodiment a sofa bed 1 may be provided with only one sofa bed sliding system 100, preferably arranged at the centre of the fixed frame structure 10 and at the underside of the seat 3. Combinations of the above mentioned locations of the sofa bed sliding systems 100 are also possible.

In FIG. 3 the sofa bed 1 is shown in a fully extended position corresponding to a bed position. In this position the seat 3 has been moved to its most extended position out from the fixed frame structure 10, and the backrest 2 has been pivoted downwards in a forward direction (i.e. towards the seat 3) so that a common bed area 5 is formed by the seat 3 and the back side of the backrest 2.

Figure 4:
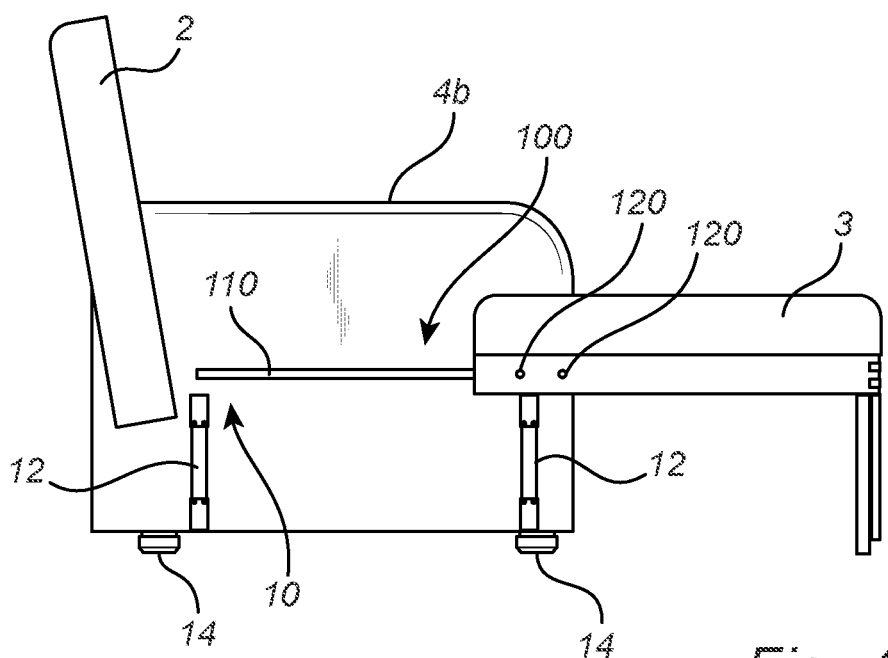
FIG. 4 is a cross-sectional view of the sofa bed shown in FIG. 2.

Movement of the seat 3 relative the fixed frame structure 10 is further explained with reference to FIG. 4. The fixed frame structure 10 comprises the armrests 4a-b (although only one armrest 4b is shown in FIG. 4), and ribs 12 or other supporting elements forming a rigid support for the seat 3, the backrest 2, and the fixed armrests 4a-b. The fixed frame structure 10 typically also includes feet 14 which may be arranged at the underside of the armrests 4a-b.

Figure 5:
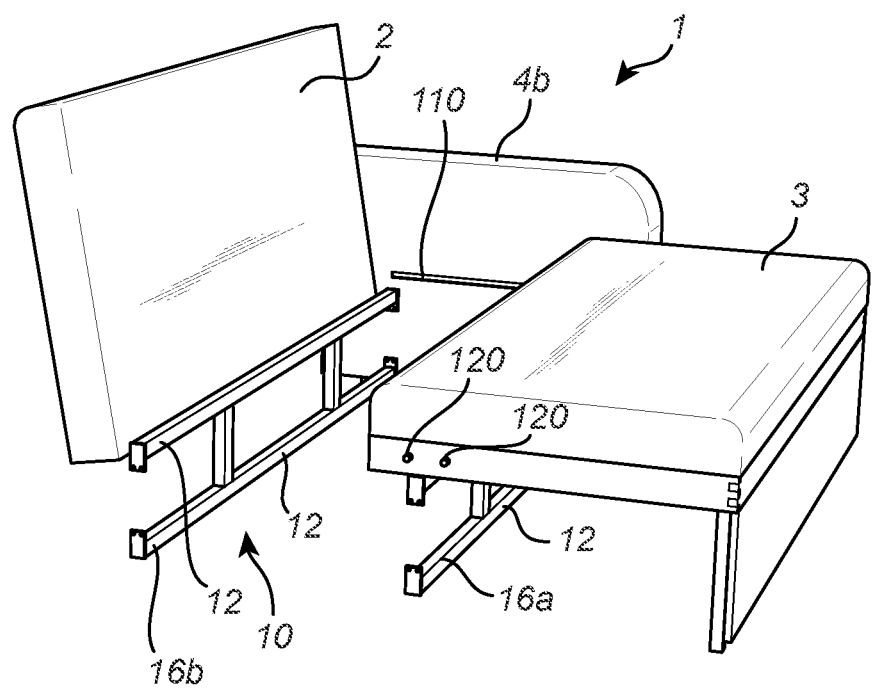
FIG. 5 is an isometric view of parts of the sofa bed shown in FIGS. 1-4.

In FIG. 5 the frame structure 10 is shown in further detail. In the shown example the frame structure 10 is formed by two vertical members 16a, 16b, each such member 16a-b being formed by one or more ribs 12 and extending between the two armrests 4a-b. The frame structure 10 is also provided with some kind of pivoting means, e.g. a hinge or similar, connecting the backrest 2 in a pivotal manner to the frame structure 10. The pivoting means may e.g. be provided at the inner side of each armrest 4a-b, or at the upper portion of the rear vertical member 16b.

As mentioned previously the purpose of the sofa bed sliding system 100 is to connect the frame structure 10 to one moveable sofa bed part, in this case the seat 3. As can be seen in FIGS. 4-5 the sofa bed sliding system 100 is based on the provision of a sliding surface 110 and one or more sliding members 120 engaging with the sliding surface 110 in a low-friction manner.

In the shown embodiment, which will be further described in the following, the outer lateral ends of the seat 3 is provided with one or more sliding members 120 protruding outwards, i.e. towards the adjacent armrest 4a-b. The inner side of each armrest 4a-b is provided with the sliding surface 110, extending along the armrest 4a-b in a more or less horizontal direction. When pulled, the seat 3 will thus be allowed to move outwards as the sliding members 120 are free to move against the sliding surface 110.

The exact position of the sliding members 120 is not critical, however they should preferably be arranged so that they remain in contact with the sliding surface 110 in each end position of the seat 3.

In the embodiment illustrated in FIGS. 4 and 5 there are two (2) sliding members 120 arranged at each side of the seat 3. In accordance with an alternative embodiment there may be only one (1) sliding member 120 arranged at each side of the seat 3. This could mean, for example, that only the rearmost sliding member 120 on each side of the seat 3 of the embodiment of FIGS. 4 and 5 remains. In this latter case it becomes possible to slightly tilt the outer end of the seat 3 upwards in the process of drawing it out from the frame structure 10 (compare FIG. 2), since the seat 3 may slightly turn around an axis formed by such rearmost sliding members 120 on the respective sides of the seat 3. Such tilting upwards of the seat 3 makes it easier to draw out the seat 3 should there be some obstacle, such as a carpet, in front of it.

Embodiments of a sofa bed sliding system 100 for a sofa bed 1 is shown in FIGS. 6a-11b. These embodiments of a sofa bed sliding system 100 allow for a semi-full extension of the seat 3, meaning that the seat 3 may be drawn out from the frame structure 10 to a stop position in which the rear end of the seat 3 is still arranged within the area of the frame structure 10. In other words, the moveable sofa bed part (i.e. the seat 3) cannot be pulled out beyond the front end of the frame structure 10.

Figure 6A:
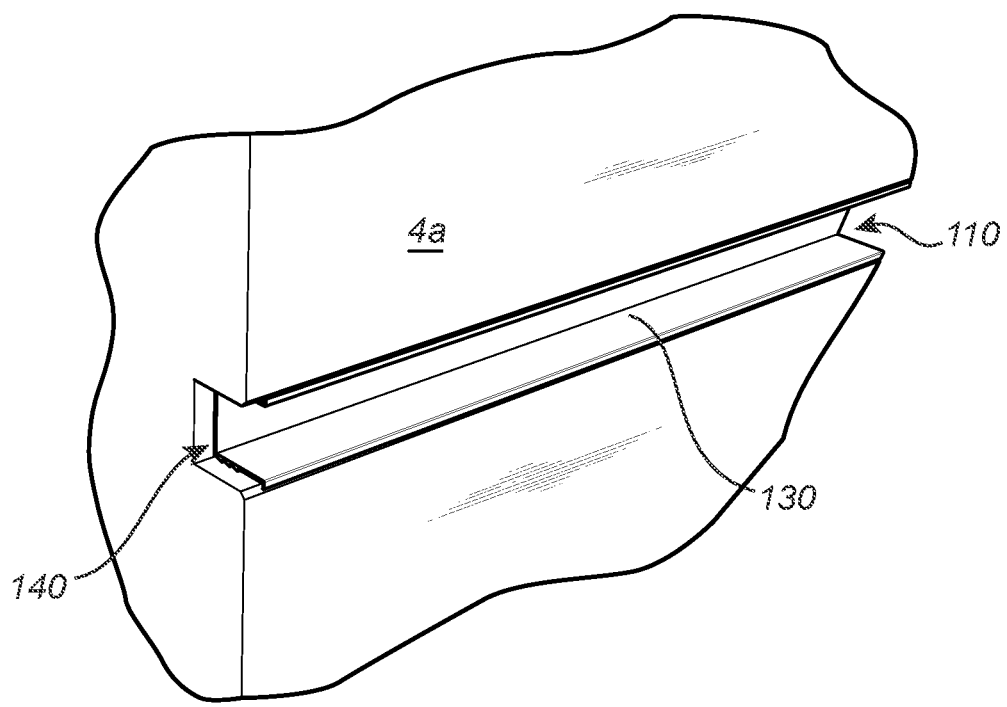
FIG. 6a is an isometric view of parts of a sofa bed sliding system according to an embodiment.
Figure 6B:
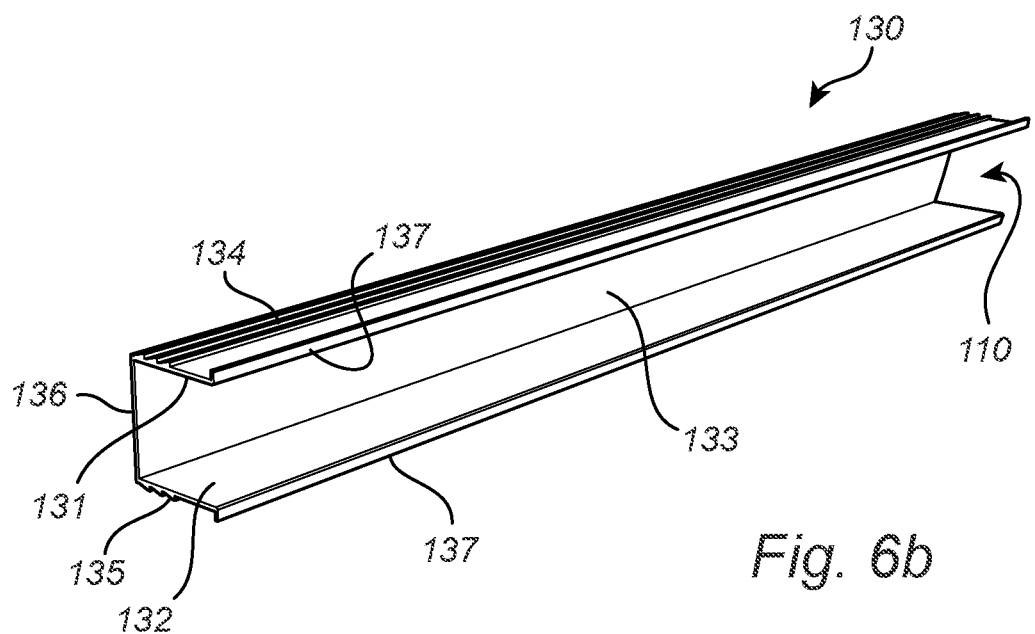

As is shown in FIG. 6a the sliding surface 110 is provided by means of an insert 130 being arranged in a recess 140 of the inner side of the respective armrests 4a-b. The insert 130 is provided with a low friction sliding surface 110 in accordance with the description below. In a preferred embodiment this low friction surface 110 is formed onto the insert 130 having a C-shape dimensioned to fit within the pre-made recess 140 at the inner side of the respective armrest 4a-b. The insert 130 is shown in FIG. 6b. Preferably the insert 130 extends along the entire length of the recess 140, or close to the entire length of the recess 140. The insert 130, preferably being made of metal, thus has an upper inner surface 131, a lower inner surface 132, and a distal inner surface 133. The upper and lower inner surfaces 131, 132 are preferably extending in parallel with each other whereby the distal inner surface 133 extends perpendicularly to the upper and lower surfaces 131, 132. The upper and lower surfaces 131, 132 thus extend in the horizontal plane, while the distal surface 133 extends in the vertical plane when arranged at the armrests 4a-b. All surfaces 131-133 are provided with superior low friction properties according to the principles described below, and these together form, in this embodiment, the low friction surface 110 of the sliding system 100.

The insert 130 is attached to the recess 140 e.g. by an adhesive, by friction or similar. For this purpose the outer surfaces of the insert 130, i.e. the upper outer surface 134, the lower outer surface 135, and the distal outer surface 136 may be provided with a rough surface in order to increase the contact area for the adhesive, and/or to provide for friction based attachment. These surfaces 134, 135, 136 thus form a fastening arrangement adapted for connecting the insert 130 to the frame structure 10. The proximal end of the upper and lower surfaces 131, 132, 134, 135 may also be provided with a respective flange 137 in order to secure the position of the insert 130 relative the planar surface of the inner side of each armrest 4a-b.

The sliding surface 110 is configured to receive at least one sliding member 120 provided on the seat 3 of the sofa bed 1. The low friction surface 110 of the insert 130 is thus allowed to engage with the sliding members 120 such that the moveable sofa bed part 3 can be pulled, by means of the sofa bed sliding system 100, in and out relative the fixed frame structure 10 of the sofa bed 1.

Figure 7:
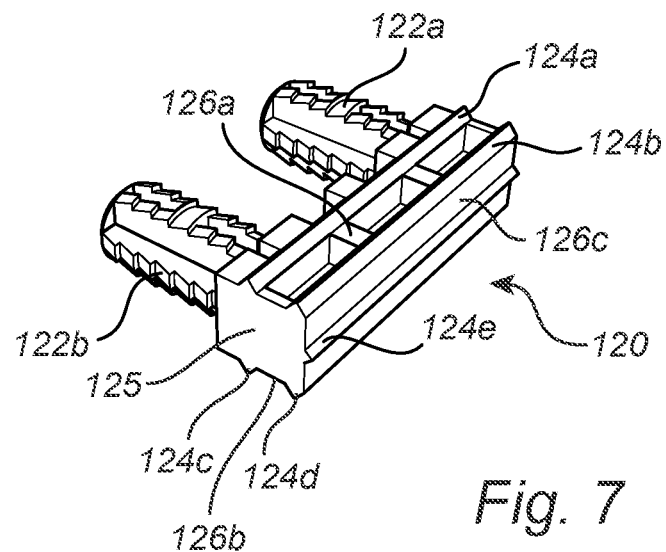
FIG. 7 is an isometric view of a sliding member forming part of a sofa bed sliding system according to an embodiment.

In FIG. 7 one example of a sliding member 120 is shown having fastening devices in the form of two dowels 122a, 122b to be pushed into mating recesses, such as holes, at the lateral sides of the associated seat 3. Other suitable fastening devices of the sliding member 120 could e.g. include adhesives, screws, threaded screw holes, shafts, etc. However for furniture manufacturing the use of dowels 122a, 122b has proven to be particularly advantageous due to its robustness in combination with the extremely fast and simple attachment procedure.

According to an alternative embodiment the two dowels 122a, 122b could be replaced by one shaft connecting the sliding member 120 to the seat 3. Such shaft would make it possible to turn a main body 125 of the sliding member 120 in relation to the seat 3, and such turning may be an advantage in conjunction with the above mentioned tilting of the seat 3 when drawing it out from the frame structure 10.

As has already been explained above the sofa bed sliding system 100 comprises the sliding surface 110 and at least one sliding member 120. The sliding surface 110 is typically linear, such as formed by a linear aluminum or steel profile. By arranging the interface between the sliding surface 110 and the sliding member 120 in sliding contact a linear plain bearing is provided. The sliding member 120 is arranged to allow for linear movement of the sliding member 120 in sliding over the sliding surface 110 along the longitudinal axis. Further, the sliding surface 110 may be provided in the shape of a groove, e.g. by means of the insert 130 shown in FIGS. 6a-b, extending along a longitudinal axis and defining a slide direction.

The insert 130 having a groove, forming a track, improves the control of the lateral position of the sliding member 120 in relation to the sliding surface 110 when the sliding member 120 slides along the sliding surface 110.

Further, the part of the sliding member 120 arranged in contact with the sliding surface 110 may be configured as at least one blade extending in the sliding direction. It was surprisingly found that decreasing the contact area at the interface between the sliding surface 110 and the sliding member 120 reduced the friction. Normally the risk for the bearing seizing typically increases with reduced contact area. In order to provide the sliding system 100, the sliding member 120 comprises at least one contact point in contact with the sliding surface 110 at the interface between the sliding surface 110 and the sliding member 120. According to an embodiment, the contact area of each individual contact point is less than 3 $mm^2$, such as less than 1.5 $mm^2$, or less than 0.75 $mm^2$. The slide member 120 may further be provided with more than one contact point, such as 2, 3, or 4 contact points. If the sliding member 120 is provided with one or more blade(s) extending in the sliding direction, the edge of the respective blade(s) represents the contact point.

It has been found that the friction becomes lower when the contact pressure between the sliding member 120 and the sliding surface 110 is relatively high. The contact pressure is calculated by dividing the load carried by each individual contact point by the contact area of the contact point. In an example, in which a sliding system of a somewhat similar type was tested for sliding doors the contact pressure was calculated. The sliding door had a total weight of 8.5 kg meaning a total load of 83.3 N. The sliding door was carried by two sliding members where each sliding member had four contact points, each such contact point having an area of 0.675 $mm^2$. The contact pressure was then: 83.3 N/(2× 4×0.675 $mm^2$)=15.4 N/$mm^2$. Similar calculations may be performed for the present sofa bed sliding system and similar high loads are suitable. Hence, preferably, the contact pressure in said at least one contact point is at least 4 N/$mm^2$, more preferably at least 8 N/$mm^2$, such as at least 12 N/$mm^2$. Preferably, the contact pressure is lower than the strain at yield (=yield strength) for the material from which the sliding member 120 is made.

In order to provide low friction, at least the part of the sliding member 120 in contact with the sliding surface 110 is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may preferably be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). These polymers are particularly good at combining mechanical strength with a low friction in the present arrangements. Further, not only the part of the sliding member 120 in contact with the sliding surface 110 may be made of a polymer, but the entire sliding member 120. Thus, sliding member 120 may be made from a plastic comprising a polymer.

According to an embodiment the sliding member 120 may be provided with two parallel, displaced blades in order to reduce the risk for rotation along the sliding axis. Further, the sliding surface 110 may be provided with two parallel depressions arranged along each side of its longitudinal sliding axis (see FIG. 8). Parallel depressions may support and guide such two parallel blades of the sliding member 120. Furthermore, the sliding member 120 may be provided with two or more parallel blades arranged along the same longitudinal axis. The sliding member 120 may be provided with two parallel blades adapted for running in the same depression independently of the presence, or non-presence, of parallel, displaced blades adapted for running in two parallel depressions.

Still having FIG. 7 in mind and again returning to the description regarding the general principle of the sliding system 100, the sliding member 120 is preferably made of plastic. Each sliding member 120 has a number of relatively sharp protrusions 124a-e, e.g. having the form of blades in accordance with the description above, extending out from a main body 125. When mounted the dowels 122a-b are received within the side of the seat 3 so that only the main body 125 with its protrusions, i.e. blades, 124a-e protrude into the respective insert 130 of the adjacent armrest 4a-b.

The sliding member 120 being shown in FIG. 7 has five protrusions 124a-e having the shape of blades. The upper surface 126a of the main body 125 is provided with two parallel protrusions 124a-b, the lower surface 126b of the main body 125 is provided with two parallel protrusions 124c-d, and the distal surface 126c of the main body 125 is provided with one protrusion 124e. Each protrusion 124a-e may extend along the entire length of the main body 125, as illustrated in FIG. 7, but it is also possible to divide each protrusion into several shorter segments. The upper and lower protrusions 124a-d ensure the correct vertical position of the sliding member(s) 120 within the insert 130, while the distal protrusion 124e provides alignment in the horizontal plane relative the insert 130.

Hence, the sliding member 120 is provided with at least one blade 124a-b, the tip of which extends in a first, i.e. upwards, direction from a first surface 126a, and at least one blade 124c-d, the tip of which extends in a second, i.e. downwards, direction from a second surface 126b. As is evident from FIG. 7 the first and second surfaces 126a-b are parallel, and the first upward direction is opposite to the second downward direction.

The sliding member 120 is also provided with at least one blade 124e extending in a third, i.e. outwards, direction from a third surface 126c. The first and third surfaces 126a, 126c are obviously non-parallel, as the third surface 126c extends between the first and second surfaces 126a-b. The first and second directions are thus perpendicular to the third outwards direction.

Each protrusion or blade 124a-e preferably has a pyramidal shape, i.e. the distal end of each protrusion 124a-e forms an apex. Hence each protrusion 124a-e will form only a very small contact area with the insert 130. It should be understood that the exact number of sliding members 120 for each side of the seat 3 and the exact configuration of the protrusions 124a-e are to be determined based on specific application parameters, such as length of the sofa bed 1, the desired force being required to pull and push the seat 3, the material of the sliding member 120, the mechanical strength of the sliding surface 110, etc.

Figure 8:
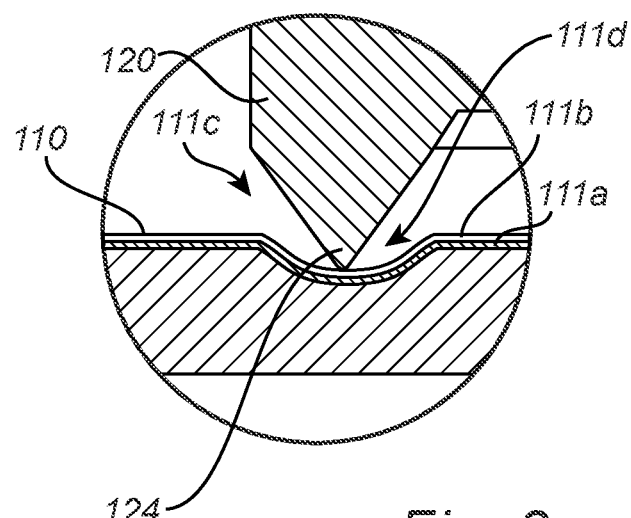
FIG. 8 is a cross-sectional view of the contact between a sliding member and a sliding surface according to an embodiment.

FIG. 8, being an enlarged principle view of the contact between a protrusion, e.g. a blade, 124 and the sliding surface 110, illustrates how the sliding surface 110 is coated with the lacquer comprising a resin 111a. The lacquer comprising a resin 111a is in turn coated with a lipophilic composition coating 111b. Thereby a slide layer 111c is formed. The sliding member 120 may slide over this slide layer 111c at a very low friction. As can be seen in FIG. 8 the sliding surface 110 is provided with a concave depression 111d for receiving the protrusion 124 of the sliding member 120, in accordance with the description above. Also, FIG. 8 clearly shows the relatively sharp tip of the protrusion 124.

Figure 9:
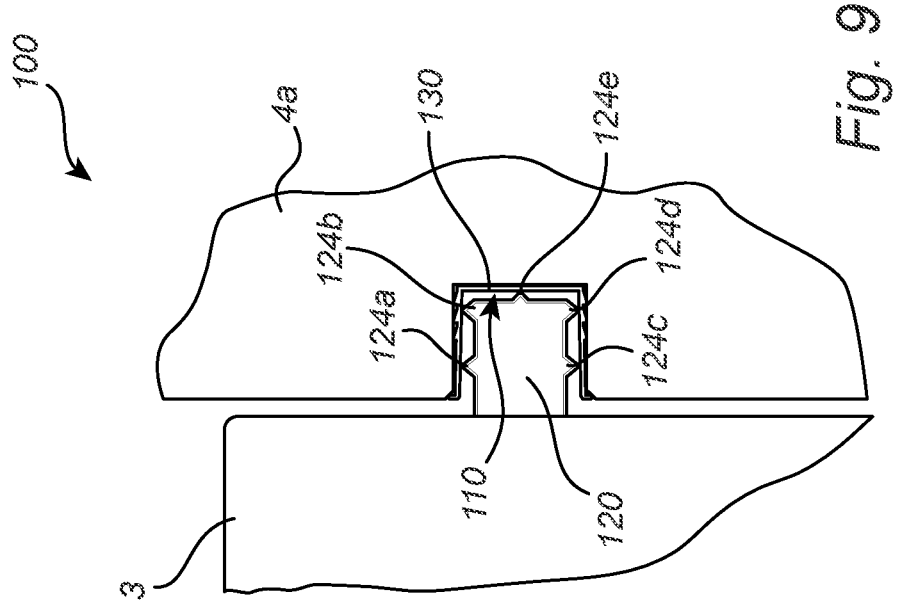
FIG. 9 is a cross-sectional view of a sofa bed sliding system according to an embodiment.

A cross-section of the sliding system 100 is shown in FIG. 9. The connection between the moveable sofa bed part, i.e. the seat 3, of the sofa bed 1 and the frame structure 10, i.e. the inner side of the armrest 4a-b, is clearly shown to be realized by a sliding member 120 being received by the insert 130 and its associated sliding surface 110 such that the protrusions 124a-e of the sliding member 120 slide against the low friction sliding surface 110 of the insert 130. A relative movement between the seat 3 and the frame structure 10 is thus possible. Although not specifically shown in FIG. 9, the sliding surface 110 is provided with a low friction slide layer in accordance with FIG. 8 and the description connected thereto.

Figure 10:
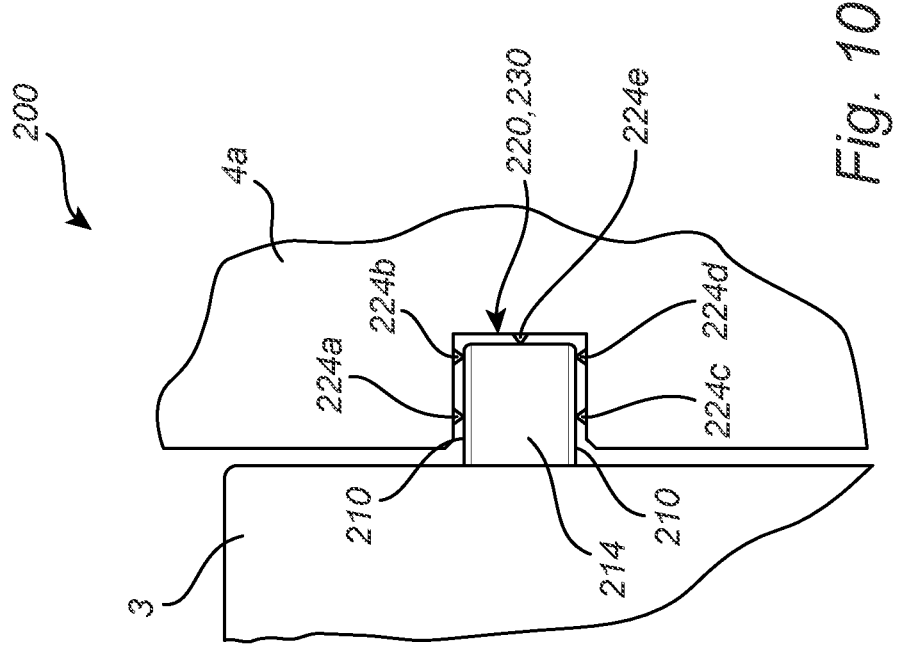
FIG. 10 is a cross-sectional view of a sofa bed sliding system according to another embodiment.

A yet further alternative for a sliding system 200 is shown in FIG. 10. This embodiment is similar to the embodiment described with respect to FIG. 9, however the sliding member and the sliding surface have changed their respective position. In this embodiment a sliding member 220 is formed by an insert 230 extending along the inner side of the armrest 4a-b. The sliding member 220 is provided with a plurality of protrusions, e.g. blades, 224a-e extending horizontally along the insert 230, the protrusions 224a-e having tips that protrude inwardly, i.e. towards the sliding surface 210, so that they can engage with planar surfaces of the sliding surface 210. For this embodiment it is possible to manufacture the insert 230 integral with a portion of the armrest 4a-b as one plastic piece, whereby all of the protrusions 224a-e are also made of plastic and are in contact with the sliding surface 210. According to an alternative embodiment the plastic insert 230 is separate from the armrest 4a-b and is provided with the protrusions. Such plastic insert 230 could have a similar design as the insert 130 illustrated in FIG. 6b, but being provided with the protrusions 224a-e.

Returning to FIG. 10 the sliding surface 210 is for this embodiment provided on a sliding surface carrying protruding member 214 having planar surfaces being treated to provide low friction in accordance with the general description of the sliding system above and below, see for example the description connected to FIG. 8. Hence, the protruding member 214 may for example be made of aluminum or steel and coated with a lacquer comprising a resin, for example applied using the Honny process, and then provided with the lipophilic composition to form the slide layer. The protruding member 214 having the sliding surfaces 210 is thus dimensioned to fit in the insert 230 of the sliding member 220, analogous to the embodiments described previously. The protruding member 214 thus has an upper sliding surface, a lower sliding surface, and a distal sliding surface. The length of the protruding member 214, i.e. the longitudinal extension of the protruding member 214 as seen along the sliding direction of the sliding member 220, is substantially shorter than the length of the sliding member 220, i.e. the insert 230. For extra robustness of the sliding system 200, two or more protruding members 214 may be arranged on the seat 3, in a manner similar to the arrangement of the sliding members 120 as illustrated in FIG. 5, the protruding members 214 being spaced apart along the sliding direction. According to an alternative embodiment the sliding system 200 may have a single protruding member 214 on each side of the seat 3, thereby making it possible to tilt the seat 3 upwards when the seat 3 is drawn out of the frame structure 10.

Figure 11A:
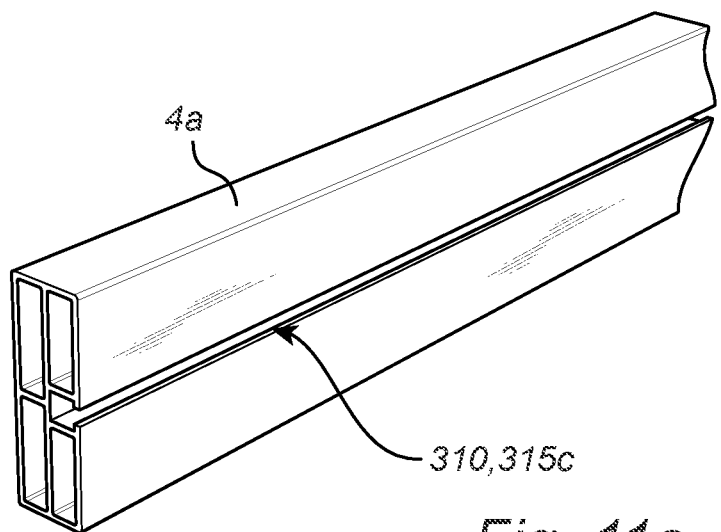
FIG. 11a is an isometric view of a part of a sofa bed sliding system according to an embodiment.
Figure 11B:
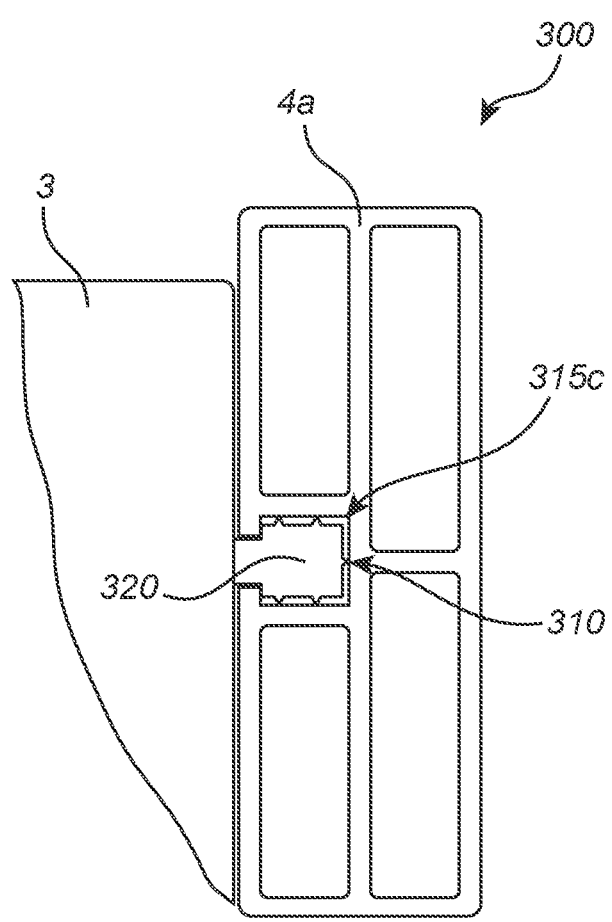

In FIGS. 11a-b a perspective view and a cross-sectional view of a part of a sliding system 300 according to another embodiment are shown. For this embodiment the sliding member 320 and its associated connection, i.e. the seat 3, are of a similar design to what has been described above with respect to e.g. FIG. 9. However the sliding surface 310 is in this embodiment formed integral with a part of the armrest 4a-b. The part of the armrest 4a-b is in this embodiment a metal profile, e.g. being made of aluminum or steel, wherein a C-shaped recess or groove 315c is integrally formed by the surfaces of the armrest profile. These surfaces of the C-shaped groove 315c are treated, according to the principles described hereinbefore, for example with reference to FIG. 8, to provide the low friction surface 310 onto which the sliding member(s) 320 are guided.

In FIG. 11b the sliding system 300 is shown, utilizing the sliding surface 310 of FIG. 11a and a sliding member 320 engaging with the low friction surface 310. As already mentioned, the sliding member 320 is similar to the sliding member 120 shown in e.g. FIGS. 7 and 9.

The embodiments described above are particularly useful for a sofa bed where the seat 3 is extendable to a semi-full position as explained with respect to FIGS. 1-3.

In order to provide the sliding system 100, 200, 300 with its respective sliding surfaces 110, 210, 310, the part or member to form the sliding layer 110, 210, 310 is lacquered with a lacquer comprising a resin. Further, the lacquer is at least partly coated with a lipophilic composition to lower the sliding resistance, i.e. the friction. It has surprisingly been found that coating a surface lacquered with a resin, for example an acrylic resin, with a lipophilic composition, such as for example sebum (natural or artificial), coconut oil, or liquid paraffin, provides a slide layer with extremely low friction (sliding resistance). The application of the lipophilic composition reduces the dynamic friction with as much as 75%. Further, and even more surprisingly, the effect is not temporarily, but seemingly permanent or at least long-lasting. The need to replenish the lubricant may hence be dispensed with.

In experiments employing aluminum profiles having been anaphoretically coated with an acrylic resin subsequently heat cured to form a lacquer (cf. the Honny process, initially disclosed in GB 1,126,855), wherein the lacquer of the aluminum profiles was coated with sebum, the friction remained nearly the same after more than 70,000 test cycles of a sliding door being reciprocated along the profile. So many cycles by far exceed the expected number on lifetime cycles. Further, washing the coated aluminum profile with water/detergent, ethanol, and/or iso-propanaol didn't affect the friction. Without being bond to any theory, it seems that the sebum coating provides an irreversibly bound lubricant coating on top of the lacquer comprising the acrylic resin. Further, the lacquer seems to be important in providing low friction.

According to an embodiment there is thus provided a slide bar, e.g. parts of the seat 3 or armrests 4*a-b* acting as a guiding member and having at least one slide, or sliding surface 110, 210, 310 coated with a lacquer comprising a resin. The lacquer is in turn at least partly coated with a lipophilic composition coating to provide a slide layer with lowered friction. By coating the lacquer, the sliding friction is not just temporarily lowered, but long term low sliding friction is obtained. As already explained the lubricating coating may be permanent, dispensing with the need to replenish the lubricating coating. Further, very low amounts of the lipophilic composition are needed to provide lowered friction. Thus, contamination of the lubricating coating does not pose any pronounced problem, as the coating, due to the very low amount present, does not have substantial adhesive properties. This is in contrast to the normal use of lubricants in plain bearings. Further, exposure to contaminations, e.g. dust etc., has been shown not to affect the lowered friction. Neither is the lubricating coating sensitive to washing. Wiping the sliding surfaces 110, 210, 310 with a dry and/or wet cloth, does not affect the lowered friction.

Such a low amount of the lipophilic composition coating is needed, that the lipophilic composition may be applied to a sliding member 120, 220, 320 rather than to the sliding surfaces 110, 210, 310. In sliding over the sliding surfaces 110, 210, 310, the lipophilic composition will be transferred to the sliding surface to provide a lipophilic composition coating. Hence, the lipophilic composition coating could be applied to the sliding surface 110, 10, 310, to the sliding member 120, 220, 320, or both.

According to an alternative embodiment a slide member is a sliding part whose slide layer, having a similar composition as the slide layer described hereinbefore, is arranged to slide along the longitudinal axis of a linear slide profile, e.g. a plastic profile, to form a linear plain bearing. At least the sliding surface of the sliding part may, according to one embodiment, be an aluminum surface, preferably having an anodized oxide surface layer, onto which the lacquer is applied. The thickness of anodized oxide surface layer is preferably at least 5 micrometers, more preferably at least 10 micrometers. Further, the thickness of the anodized layer may be less than 250 micrometers, such as less than 100 micrometers or less than 50 micrometers.

While the sliding surface 110, 210, 310 preferably is formed on an aluminum profile with an aluminum oxide layer, also other materials coated with a lacquer comprising a resin may be considered. In order to allow for long term use and to carry loads, the sliding surface 110, 210, 310 is typically made from a hard material, such as metal or glass. Especially the surface of the slide member should preferably be hard. The Vickers hardness of the material from which the sliding surface 110, 210, 310 is made, may be at least 50 MPa, more preferably at least 100 MPa, still more preferably at least 150 MPa, and most preferably at least 300 MPa. According to an embodiment, the sliding surface 110, 210, 310 is formed on a metal bar, such as an aluminum bar or a steel bar. While it is preferred if an aluminum profile has an oxide layer, also a raw, i.e. not oxidized, lacquered aluminum profile may be used. It is however preferred if the surface of the aluminum profile is oxidized to provide the aluminum profile with a hard oxide surface layer.

The sliding surface 110, 210, 310 may be formed on an aluminum bar or member. Further, the surface of the aluminum bar or member coated with the lacquer may be an aluminum oxide layer. The thickness of such oxide layer may be at least 5 micrometers, more preferably at least 10 micrometers. Further, the thickness of the oxide layer may be less than 250 micrometers, such as less than 100 micrometers or less than 50 micrometers. As known in the art, the durability and hardness of the surface of aluminum profiles may be improved by oxidation due to the properties of aluminum oxide. The oxide layer initially provided by anodically oxidation is porous. While the pores may be closed by steam treatment, sealing via anaphoretically coating with an acrylic resin subsequently heat cured to form the lacquer, is even more effective in sealing the porous aluminum oxide layer: This method, firstly disclosed by Honny Chemicals Co. Ltd. (cf. GB 1,126,855), is often referred to as the Honny process.

Further, compared to a plastic sliding surface, a hard, stiff bar, such as aluminum or steel bar, may accept far more heavy loads and still provide low friction.

In addition, it has been found that a relatively high contact pressure in the contact between the sliding surface 110, 210, 310 and the sliding member 120, 220, 320 reduces the friction. For this reason as well it is beneficial to make the sliding surface 110, 210, 310 from a hard material, such as aluminum or steel, since such materials can accept higher contact pressures, thereby reducing friction. The low friction also at high contact pressure is an advantageous property for a sofa bed with parallel sliding members, as assemblies with two parallel members slidingly movable relative to two other parallel members often get stuck even if only slightly tilted.

According to an embodiment, the low friction sliding surface 110, 210, 310 is formed on a linear, aluminum profile. Preferably, the linear aluminum profile is oxidized (e.g. anodized) in order to increase the hardness of the surface. The profile is typically anaphoretically coated with an acrylic resin subsequently heat cured, thereby providing a linear sliding surface 110, 210, 310 having lacquered slide surface. The aluminum profile may be anodized to obtain an anodized layer thickness of at least 5 micrometers, more preferably at least 10 micrometers, prior to application of the resin of the lacquer. Further, thickness of the anodized layer may be less than 250 micrometers, such as less than 100 micrometers or less than 50 micrometers. Such profiles may be obtained via the Honny process (cf. above) or one of its derivatives. Typically, the Honny process is used to provide white, glossy profiles. However, neither the Honny process nor the present embodiments are limited to white profiles. The preferable feature is that the lacquer is suitable for being coated with the lipophilic composition coating.

As known in the art, various resins, e.g. thermosetting resins, may be used to lacquer aluminum bars and other bars, i.e. to form a lacquer on aluminum bars and other bars. Further, thermo setting resins may also be used to lacquer other metal members, e.g. a sliding member made of steel. The lacquer comprises a resin. As known to the skilled person, a lacquer is a hard, thin coating. The resin of the lacquer may for this application preferably comprise polar groups, such as hydroxyl groups, carboxylic acid groups, amide groups, cyano groups (nitrile groups), halide groups, sulfide groups, carbamate group, aldehyd groups, and/or ketone groups. Further may the resin of the lacquer be a thermosetting resin.

Examples of resins for lacquering metal comprise acrylic resins and polyurethane resins. According to an embodiment, the resin is an acrylic resin, such as an acrylate resin, an acrylamide resin, a methacrylate resin, or a methyl metachrylate resin, and mixtures thereof. According to another embodiment, the resin is a polyurethane resin. The acrylic resin may be a thermosetting resin.

According to another embodiment, the resin of the lacquer is selected from the group consisting of: acrylic resins, acrylate resins, acrylamide resins, methacrylate resins, methyl metachrylate resins, acrylonitrile resins, styreneacrylonitril resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins.

Further, the thermosetting resin may the reaction product or a mechanical mixture of an alkyd resin and water-soluble melamine resin, or of a vinyl-modified unsaturated alkyd resin and a water-soluble melamine resin, the water-soluble melamine resin being obtained from hexamethylol melamine hexaalkylether. Vinyl modified unsaturated alkyd resins may be made by polymerization of a vinyl monomer with an alkyd resin composed of an unsaturated oil or fatty acid. As known to the skilled person, the term "vinyl monomer" relates to a monomer having a vinyl group (—CH═CH2) in the molecule, such as an acrylic ester, for example methyl acrylate and ethyl acrylate, a methacrylic ester, for example methyl methacrylate and hydroxyethyl methacrylate, an unsaturated, organic acid, for example acrylic acid and methacrylic acid, and styrene.

Processes for obtaining thermosetting acrylic resins are well-known to the skilled person. As an example, they may be obtained by heating and stirring a mixture consisting of organic solvents, such as methanol, ethylene glycol, monobutyl ether, and/or cyclohexanone, unsaturated organic acids, such as acrylic acid, methacrylic acid, and/or maleic anhydride, a cross-linking vinyl monomer (as defined above), such as methylol-acrylamide and/or methylol methacrylamide, a polymerizable vinyl monomer, such as styrene and/or acrylic acid ester, polymerization catalysts, such as benzoyl peroxides and/or lauroyl peroxides, and polymerization regulators, such as dodecyl mercaptan and/or carbon tetrachloride, to carry out polymerization, thereafter neutralizing the product with, for example, an aqueous solution of ammonia and/or triethylamine to make the resin soluble in water. Further, as known to the skilled person, thermosetting resins composed of alkyd resins and water-soluble melamine resin may be obtained from hexamethylol melamine hexaalkyl ether, may be obtained by mixing a water-soluble melamine resin at a temperature of from room temperature to 100° C. with an alkyd resin modified with a fatty acid, the alkyd resin having an acid value of from 10 to 80, and being obtained by heating a mixture consisting of (1) a saturated or unsaturated aliphatic acid, (2) ethylene glycol, glycerol, polyethylene glycol, other polyhydric alcohol or an epoxide, (3) adipic acid, sebacic acid, maleic anhydride or other polybasic acid or anhydride, and (4) a small quantity of cyclohexanone, toluene or other organic solvent. Thermosetting resins may also be obtained by mixing a water-soluble melamine resin and an alkyd resin from the ester exchange process, the resin being obtained by esterifying a mixture of dehydrated castor oil, an abovementioned polyhydric alcohol and a small amount of an ester exchanging catalyst such as caustic potash, and thereafter esterifying also an above-mentioned polybasic acid or anhydride. As further known to the skilled person, thermosetting resins consisting of a modified acrylic resin and a water-soluble melamine resin, obtained from hexamethylol melamine hexaalkyl ether, may be obtained by polymerising by heating and stirring a mixture consisting of organic solvents, such as methanol, ethylene glycol, monobutyl ether and/or cyclohexanone, unsaturated acids, such as acrylic acid and/or methacrylic acid, a vinyl monomer (as hereinabove defined), such as styrene and/or acrylic acid ester, a cross-linking vinyl monomer, if necessary, such as methylol, is normally used. Good results may be obtained by using a concentration of resin of from 5 to 20% by weight and by regulating the voltage and the initial current density within a safe and economical range.

As known to the skilled person further resins for use in lacquering metal surfaces are known in the art. As an example, the resin of the lacquer may be selected from the group consisting of cationic epoxy electrocoat, epoxy and polyester resins, and polyester resins. Still further, lacquers adapted for autodeposition coating, such as Autophoretic™ coatings (e.g. Aquence™ Autophoretic® 866™ and BONDERITE® M-PP930™, the latter being an epoxy-acrylic urethane) available from Henkel AG, DE, may also be used in lacquering surfaces comprising iron.

The slide surface 110, 210, 310 may be lacquered by electrocoating involving dipping a metal bar into a bath containing the lacquer and applying an electric field to deposit lacquer onto the metal bar acting as one of the electrodes. Further, the lacquer may be provided in powder form or in liquid form. Both powder and liquid lacquers may be sprayed onto the slide surface 110, 210, 310 to coat it. For powder lacquers, electro static coating may be used. For liquid lacquers a wet spray application or application in a bath may be used. Further, liquid lacquers in a bath may apart from electrocoating be applied by autodeposition.

In order to provide low friction, the thickness of the lacquer should be as even as possible. Thus it may be preferred to apply the lacquer by an electrocoating process, e.g. anaphoretic coating (cf. the Honny method) or cataphoretic coating, providing very even coatings. There are two types of electrocoating, i.e. anodic and cathodic electrocoating. Whereas the anodic process was the first to be developed commercially, the cathodic process is nowadays more widely used. In the anodic process, a negatively charged material is deposited on the positively charged component constituting the anode. In the cathodic process, positively charged material is deposited on the negatively charged component constituting the cathode. In the art, cathodic electrocoating is also known as cathodic dip painting (CDP), cathodic dip coating, cataphoretic coating, cataphoresis and cathodic electrodeposition. Further, the electrocoating process may also be referred to by the trade names of the bath material used. Examples include Cathoguard (BASF), CorMax (Du Pont), Powercron (PPG) and Freiotherm (PPG).

Further, also electrostatically coating by powder lacquers or autodeposition in a bath provides even coatings and may thus be used.

In lacquering steel surfaces, autodeposition may be used. As recognized by the skilled person, one of the important steps in autodeposition is the coating bath itself, where water-based paint emulsion at low solids (usually around 4-8% by weight) is combined with two other products. A "starter" solution of acidified ferric ($Fe^{3+}$) fluoride initiates the coating reaction and an oxidizing product stabilizes the metal ions in the solution. The coating emulsion is stable in the presence of ferric ions, but unstable in the presence of ferrous ions ($Fe^{2+}$). Therefore, if ferrous ions are liberated from the metal substrate, localized paint deposition will occur on the surface. Immersion of a component made from ferrous metal (e.g. steel) into an autodeposition bath causes the acidic environment to liberate ferrous ions, thereby causing the coating emulsion to be deposited, forming a mono-layer of paint particles. Henkel Adhesive Technologies (US)//Henkel AG & Co. KGaA (Germany) provides coatings under the trademark BONDERITE® for use in autodeposition.

As the lacquer coated on the sliding surface 110, 210, 310 typically is more compressible than the material of the sliding surface 110, 210, 310 itself, and as a load carrying sliding member will apply pressure on the lacquer in sliding over the sliding surface 110, 210, 310, the thickness of the lacquer preferably is to be kept thin to reduce compression of it. Compressing the lacquer may negatively affect the sliding resistance; especially at the start of the sliding sequence, i.e. when the sliding member starts to move along the sliding surface 110, 210, 310 from a previous state of being at rest. According to an embodiment, the thickness of the lacquer coated on the sliding surface 110, 210, 310 is thus 100 μm or less, preferably 75 μm or less, more preferably 50 μm or less. Further, the thickness of lacquer coated on the sliding surface 110, 210, 310 may be 5 to 75 μm, such as 10 to 50 μm, or 15 to 40 μm. Layers of these thicknesses have been found to provide for efficient sliding behavior, also at the instance when the sliding member starts to move along the sliding surface 110, 210, 310.

Not only the low dynamic friction provided by the present slide member, but also the low difference between the static and dynamic friction provided by the present slide member is beneficial in terms of the sliding behavior.

In order to reduce the friction of the sliding surface 110, 210, 310, the sliding surface 110, 210, 310 is, at least partly, coated with a lipophilic composition coating to provide a slide layer. Further, while various components may be present in the lipophilic composition coating present on the lacquer, the composition typically comprises components with intermediate to long carbon chains, e.g. carbon chains having a carbon atom length of C6 or more, such as C8 or more. Thus, the lipophilic composition coating may comprise compounds comprising C6 to C40, such as C8 to C30 or even C10 to C24, non-aromatic hydrocarbyl groups. Typical examples of such non-aromatic hydrocarbyl groups are alkenyl groups and alkyl groups, e.g. alkyl groups. Examples of compounds comprising such non-aromatic hydrocarbyl groups are:

C6 to C40 non-aromatic hydrocarbons, such as alkenes and/or alkanes, e.g. alkanes;

tri-glycerides, e.g. triglycerides comprising C6 to C40, such as C8 to C30, non-aromatic hydrocarbyl groups; and fatty acids, e.g. C6 to C40, such as C8 to C30, carboxylic acids, and esters thereof, such as alkyl esters of fatty acids, e.g. methyl esters.

As known to the skilled person and as recognized in IUPAC's gold book (International Union of Pure and Applied Chemistry, Compendium of Chemical Terminology—Gold Book, Version 2.3.3 of 2014 Feb. 24):

hydrocarbon denotes compounds consisting of carbon and hydrogen only;

hydrocarbyl denotes univalent groups formed by removing a hydrogen atom from a hydrocarbon;

alkane denotes acyclic branched or unbranched hydrocarbons having the general formula CnH2n+2;

alkene denotes acyclic branched or unbranched hydrocarbons having one or more carbon-carbon double bond(s);

alkyl denotes a univalent group derived from alkanes by removal of a hydrogen atom from any carbon atom —CnH2n+1;

alkenyl denotes an univalent group derived from alkenes by removal of a hydrogen atom from any carbon atom;

fatty acid denotes an aliphatic monocarboxylic acid;

triglyceride denotes an ester of glycerol (propane-1,2,3-triol) with three fatty acids (tri-O-acylglycerol); and non-aromatic denotes a compound not comprising any cyclically conjugated molecular entity with increased stability due to delocalization.

According to an embodiment, the lipophilic composition coating present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of compounds comprising C6 to C40, such as C8 to C30, alkyl groups. Thus, the lipophilic composition coating may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % C6 to C40, such as C8 to C30, alkenes and/or alkanes, e.g. alkanes. Further, the lipophilic composition coating present on the lacquer may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % triglycerides and/or fatty acids (or alkyl esters thereof).

Whereas fatty acids have been found to improve the lubricating effect of mixtures of alkanes, such as liquid paraffin, they are less effective if used on their own. It is thus preferred if the lipophilic composition present on the lacquer is not only composed of fatty acids. The lipophilic composition present on the lacquer may thus comprise less than 99 wt. % fatty acids, such as less than 95 wt. % fatty acids. However, lipophilic compositions essentially only comprising triglycerides, such as coconut oil, provide very low friction and do thus represent a preferred lipophilic composition present on the lacquer.

According to an embodiment, the lipohilic composition coating present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of alkenes and/or alkanes, e.g. alkanes and 0.1 to 50 wt. %, such as 1 to 40 wt. % or 5 to 30 wt. % triglycerides and/or fatty acids.

According to another embodiment, the lipophilic composition coating present on the lacquer comprises at least 1 wt. % such as at least 5 wt. %, 10 wt. %, 25 wt. %, 50 wt. %, 60 wt. %, 75 wt. %, 80 wt. % or at least 90 wt. % in total of triglycerides and/or fatty acids and 0.1 to 95 wt. %, such as 1 to 90 wt. % or 5 to 60 wt. % alkenes and/or alkanes, e.g. alkanes.

As already mentioned, typical examples of compounds comprising C8 to C40 non-aromatic hydrocarbyl groups are tri-glycerides and fatty acids. According to an embodiment, the lipophilic composition coating present on the lacquer comprises triglycerides and/or fatty acids. The lipophilic composition coating may thus comprise more than 25 wt. %, e.g. more than 50 wt. %, such as 50 to 100 wt. %, or 75 to 95 wt. %, in total of triglycerides and fatty acids. The triglycerides and/or fatty acids may either be used as the major component in the lipophilic composition coating or as additives.

If to be used as a major component, the lipohilic composition present on the lacquer coating may comprise more than 50 wt. %, such as 50 to 100 wt. %, or 75 to 95 wt. %, triglycerides, e.g. triglycerides to at least 90%. wt composed of a glycerol residue and 3 residues of caproic acid, caprylic acid, capric acid, lauric acid, myristic acid, palmitic acid, stearic acid, and/or arachidic acid, such as 3 residues of lauric acids, myristic acid, palmitic acid, and/or stearic acid. According to an embodiment, the lipophilic composition coating present on the lacquer comprises coconut oil, such as at least 25 wt. % such as at least 50 wt. %, 60 wt. %, 70 wt. %, 75 wt. %, 80 wt. %, 85 wt. % or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipohilic composition coating present on the lacquer may comprise more than 50 wt. %, such as 50 to 100 wt. %, or 75 to 95 wt. % fatty acids, e.g. caproic acid, caprylic acid, capric acid, lauric acid, myristic acid, palmitic acid, stearic acid, and/or arachidic acid, such as lauric acids, myristic acid, palmitic acid, and/or stearic acid. Furthermore, the lipophilic composition coating present on the lacquer may comprise more than 50 wt. %, such as 50 to 100 wt. %, or 75 to 95 wt. % alkyl esters of fatty acids, e.g. methyl or ethyl esters. The esterfied fatty acids may be caproic acid, caprylic acid, capric acid, lauric acid, myristic acid, palmitic acid, stearic acid, and/or arachidic acid, such as myristic acid, palmitic acid, and/or stearic acid.

If to be used as an additive, the lipohilic composition coating present on the lacquer may comprise 0.1 to 50 wt. %, such as 1 to 30 wt. % or 5 to 15 wt. %, triglycerides, e.g. triglycerides to at least 90% composed of a glycerol residue and 3 residues of caproic acid, caprylic acid, capric acid, lauric acid, myristic acid, palmitic acid, stearic acid, and/or arachidic acid, such as 3 residues of lauric acids, myristic acid, palmitic acid, and/or stearic acid. A preferred example of composition to be used to provide a lipohilic composition coating comprising triglycerides is coconut oil. According to an embodiment, the lipophilic composition coating present on the lacquer comprises coconut oil, such as 0.1 to 50 wt. %, such as 1 to 30 wt. % or 5 to 15 wt. %, coconut oil. According to an embodiment, the lipophilic composition coating 141b present on the lacquer comprises at least 50 wt. % coconut oil, such as at least 60 wt. %, 70 wt. %, 75 wt. %, 80 wt. %, 85 wt. %, or 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipohilic composition present on the lacquer may comprise 0.1 to 50 wt. %, such as 1 to 30 wt. % or 5 to 15 wt. %, of fatty acids, e.g. caproic acid, caprylic acid, capric acid, lauric acid, myristic acid, palmitic acid, stearic acid, and/or arachidic acid, such as lauric acid, myristic acid, palmitic acid, and/or stearic acid. Furthermore, the lipohilic composition coating present on the lacquer may comprise 0.1 to 50 wt. %, such as 1 to 30 wt. % or 5 to 15 wt. %, of alkyl esters of fatty acids, e.g. methyl or ethyl esters. The esterfied fatty acids may be caproic acid, caprylic acid, capric acid, lauric acid, myristic acid, palmitic acid, stearic acid, and/or arachidic acid, such as myristic acid, palmitic acid, and/or stearic acid.

Both saturated and un-saturated compounds comprising C6 to C40 non-aromatic hydrocarbyl groups are well-known in the art. While both types of compounds will be efficient in reducing the sliding resistance, saturated compounds comprising C6 to C40 non-aromatic hydrocarbyl groups are deemed to be less sensitive to oxidative degradation. Thus, it may be preferred to use compounds comprising C6 to C40 non-aromatic hydrocarbyl groups being triglycerides composed of saturated fatty acids residues and/or saturated fatty acids in the composition. It may however not be necessary to use a 100% saturated fatty acids and/or triglycerides. As example, coconut oil is envisaged to have sufficient long term stability, though saturated fatty acids and/or triglycerides are preferred in terms of their long term stability.

As mentioned, the lipophilic composition coating present on the lacquer may comprises at least 1 wt. % C6 to C40 alkanes. As an example, the lipophilic composition coating present on the lacquer may thus comprise mineral oil, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % mineral oil. Mineral oil is a colorless, odorless, light mixture of higher alkanes from a non-vegetable (mineral) source. Further, the lipohilic composition present on the lacquer coating may comprise liquid paraffin, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % liquid paraffin. Liquid paraffin, also known as paraffinum liquidum, is a very highly refined mineral oil used in cosmetics and for medical purposes. A preferred form is the one having CAS number 8012-95-1. Furthermore, the lipohilic composition coating present on the lacquer may comprise petroleum jelly (also known as petrolatum, white petrolatum, soft paraffin or multi-hydrocarbon), such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % petroleum jelly. Petroleum jelly is a semi-solid mixture of hydrocarbons (with carbon numbers mainly higher than 25). A preferred form is the one having CAS number 8009-03-8.

Each sliding surface 110, 210, 310 is configured to be in sliding contact with at least one sliding member 120, 220, 320 provided on either the seat 3 or the backrest 4a-b, respectively. A low friction sliding surface 110, 210, 310 of the other one of said seat 3 or backrest 4a-b is thus allowed to engage with the respective sliding member 120, 220, 320 such that movement of the moveable sofa bed part (i.e. the seat 3) relative the frame structure 10 is possible.

The respective sliding members 120, 220, 320 can be attached to their respective carrier, i.e. to either the seat 3 or to the backrest 4a-b, in a number of ways. Suitable attachments could, e.g., include adhesives, screws, dowels, shafts, snap-action attachments etc.

As has already been explained above the sliding system 100, 200, 300 comprises the disclosed sliding surface 110, 210, 310 and at least one sliding member 120, 220, 320. The sliding surface 110, 210, 310 is typically linear, such as formed on a linear aluminum profile. By arranging the interface between the sliding surface 110, 210, 310 and the sliding member 120, 220, 320 in sliding contact a linear plain bearing is provided. The sliding member 120, 220, 320 is arranged to allow for linear movement of the sliding member 120, 220, 320 in sliding over the sliding surface 110, 210, 310 along the longitudinal axis. Further, the sliding surface 110, 210, 310 may be provided in the shape of a groove extending along a longitudinal axis and defining a slide direction. When the sliding surface 110, 210, 310 is provided by means of a groove, the slide layer is present in the groove.

Further, the part of the sliding member 120, 220, 320 arranged in contact with the sliding surface 110, 210, 310 may be configured as a blade extending in the sliding direction. It was surprisingly found that decreasing the contact area at the interface between the sliding surface 110, 210, 310 and the sliding member 120, 220, 320 reduced the friction. Normally the risk for the bearing seizing typically increases with reduced contact area. In order to provide the sliding system, the sliding member 120, 220, 320 comprises at least one contact point in contact with the sliding surface 110, 210, 310 at the interface between the sliding surface 110, 210, 310 and the sliding member 120, 220, 320. According to an embodiment, the contact area of each individual contact point is less than 3 mm$^2$, such as less than 1.5 mm$^2$, or less than 0.75 mm$^2$. The slide member 120, 220, 320 may further be provided with more than one contact point, such as 2, 3, or 4 contact points. If the sliding member 120, 220, 320 is configured as having a blade extending in the sliding direction, the edge of the blade represents the contact point.

It has been found that the friction becomes lower when the contact pressure between the sliding member 120, 220, 320 and the sliding surface 110, 210, 310 is relatively high. The contact pressure is calculated by dividing the load carried by each individual contact point by the contact area of the contact point. An example, in which the sliding system was utilized for sliding doors, was used to calculate the contact pressure. If the sliding door has a total weight of 8.5 kg this represents a total load of 83.3 N. The sliding door may be carried by two sliding members where each sliding member has four contact points, each such contact point having an area of 0.675 mm$^2$. The contact pressure is then: 83.3 N/(2×4×0.675 mm$^2$)=15.4 N/mm$^2$. Preferably, the contact pressure in said at least one contact point is at least 4 N/mm$^2$, more preferably at least 8 N/mm$^2$, such as at least 12 N/mm$^2$. Preferably, the contact pressure is lower than the strain at yield (=yield strength) for the material from which the sliding member is made.

In order to provide low friction, at least the part of the sliding member 120, 220, 320 in contact with the sliding surface 110, 210, 310 is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). Further, not only the part of the sliding member 120, 220, 320 in contact with the sliding surface 110, 210, 310 may be made of a polymer, but the entire sliding member 120, 220, 320. Thus, sliding member 120, 220, 320 may be made from a plastic comprising a polymer. As recognized by the skilled person, the plastic may further comprise other additives, such as fillers, colorants, and/or plasticizers. Further, the sliding member 120, 220, 320 may be made from a composite comprising a polymer, such as one of the above listed polymers, optionally filled with particles and/or fibers. The particles and/or fibers will increase the hardness, the stiffness, the creep resistance and elongation (compression) at yield of the sliding member 120, 220, 320. While not affecting the friction, presence of particles and/or fibers may affect the wear. Thus, use of particles and/or fibers in the plastic is less preferred.

According to an embodiment the sliding member 120, 220, 320 may be provided with two parallel, displaced blades in order to reduce the risk for rotation along the sliding axis. Further, the sliding surface 110, 210, 310 may be provided with two parallel depressions arranged along each side of its longitudinal sliding axis (see depression 111*d* in FIG. 8). Parallel depressions may support and guide such two parallel blades of the sliding member 120, 220, 320. Furthermore, the sliding member 120, 220, 320 may be provided with two or more parallel blades arranged along the same longitudinal axis. The sliding member 120, 220, 320 may be provided with two parallel blades adapted for running in the same depression independently of the presence, or non-presence, of parallel, displaced blades adapted for running in two parallel depressions.

Each sliding member 120, 220, 320 has at least one, and preferably a plurality of relatively sharp protrusions 124, e.g. blades in accordance with the description above, extending out from a main body 125 of the respective sliding member 120, 220, 320. When mounted the main body 125 with its projections 124 protrude towards the respective sliding surface 110, 210, 310 such that the protrusions 124 comes into sliding contact with the respective sliding surface 110, 210, 310. This is especially shown in FIGS. 7 and 9.

Each protrusion 124 may extend along the entire length of the main body 125. According to an alternative embodiment one or more of the protrusions 124 may be divided into several segments distributed along the length of the main body 125. The vertically extending protrusions 124*a-d* carry most of the load of the seat 3 and ensure the correct vertical position of the seat 3 relative to the frame structure 10, while the horizontally extending protrusion(s) 124*e* provides alignment in the horizontal plane relative the first frame structure 10.

It should be noted that each of the sliding members 120, 220, 320 has a certain length, whereby the protrusions 124 have an axial extension. The length of the respective sliding member 120, 220, 320 is preferably substantially shorter than the length of the member to which the sliding member 120, 220, 320 is connected. Although not limited to a specific value, good results have been shown using sliding members 120, 220, 320 having a length, as seen in the sliding direction, of about 2-50 mm, more preferably a length of 5-30 mm. The length of the protrusions 124 could be similar to the length of the sliding member 120, 220, 320, i.e. the protrusions 124 could have a length of 2-50 mm, more preferably 5-30 mm. In case the protrusions 124 are divided into segments along their length, each such segment could have a length of 2-10 mm, with a gap of 1-5 mm between consecutive segments.

Figure 12:
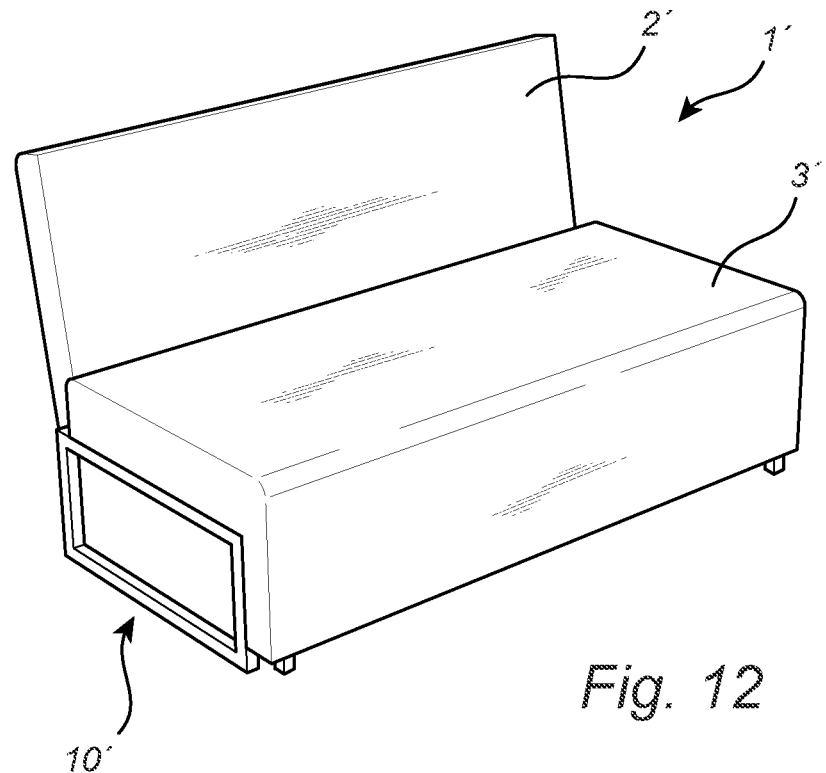
FIG. 12 is an isometric view of a sofa bed according to an embodiment.
Figure 13:
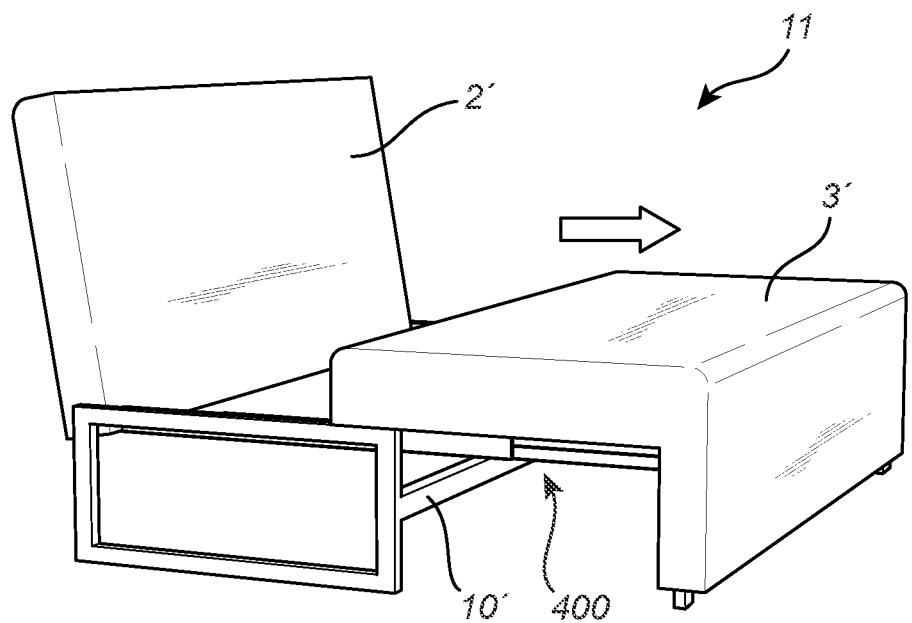
FIG. 13 is an isometric view of the sofa bed shown in FIG. 12, here shown in an intermediate state between a sofa position and a bed position.
Figure 14:
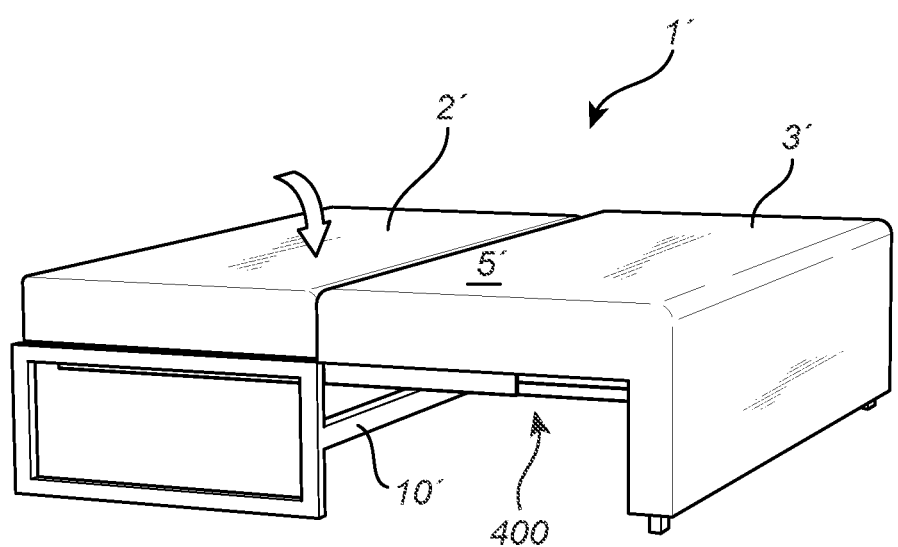
FIG. 14 is an isometric view of the sofa bed shown in FIG. 12, here shown in a bed position.

In FIG. 12 another embodiment of a sofa bed 1' is shown, utilizing a sliding system which allows for full extension. Similar to the sofa bed 1 described previously the sofa bed 1' has a backrest 2', a seat 3', and a frame structure 10'. As can be seen in FIGS. 13 and 14 the seat 3' can be pulled out from the frame structure 10' to an end position in which the seat 3' is positioned beyond the frame structure 10'. Once the seat 3' has reached its end position, the backrest 2' can be pivoted downwards to form a part of the bed area 5' together with the seat 3'.

The above-described functionality is based on a telescopic sliding system, of which several different embodiments will be described in the following.

Figure 15:
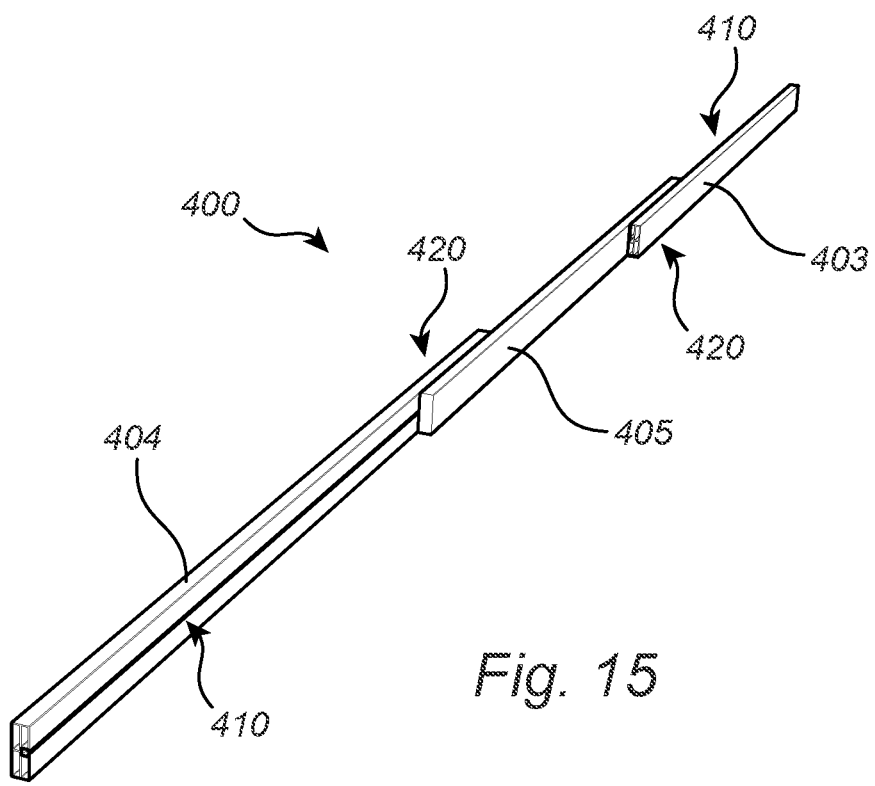
FIG. 15 is an isometric view of a sofa bed sliding system according to an embodiment.
Figure 16:
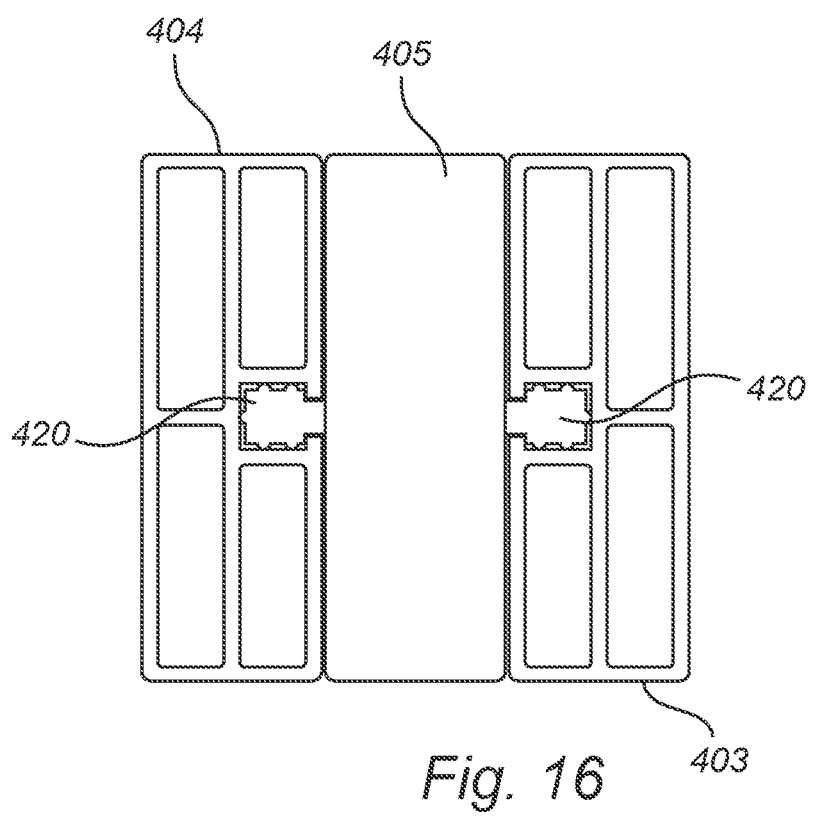
FIG. 16 is a cross-sectional view of the sofa bed sliding system shown in FIG. 15.

In FIGS. 15-16 another embodiment of a sliding system 400 is shown. This embodiment utilizes a first member 403 being provided with a sliding surface 410, a second member 404 being provided with a sliding surface 410, and an intermediate member 405 being arranged in between the first and second members 403, 404 and having at least one sliding member 420 on each side for engaging with the respective sliding surfaces 410 of the first and second members 403, 404.

The first member 403 may e.g. be attached to, or formed integral with, the seat 3' of the sofa bed 1', while the second member 404 may be attached to, or formed integral with, the frame structure 10' of the sofa bed 1'.

The intermediate member 405 will form a sliding interface with each one of the first and second members 403, 404. These sliding interfaces could be formed by using any of the alternatives for the sliding member 120, 220, 320 and the low friction surface 110, 210, 310 mentioned above.

In FIG. 16 the sliding members 420 are similar to the sliding member 120 described with reference to e.g. FIGS. 7 and 9, and such sliding members 420 are, in this embodiment, attached to opposite sides of the intermediate member 405, as best illustrated in FIG. 16.

The embodiment of FIGS. 15-16 comprises totally three members 403-405 linked to each other. It will be realized that still further members could be linked to each other in an extendable sofa bed sliding system, in case an even longer extension possibility is desired for a sofa bed.

As can be seen in FIG. 16 the two moveable parts 403, 404 are identical to the moveable sofa bed part shown in FIGS. 11a-b. However, as is readily understood one or more of the two moveable members 403, 404 could be realized as the moveable sofa bed parts shown in FIG. 9 or 10.

Figure 17:
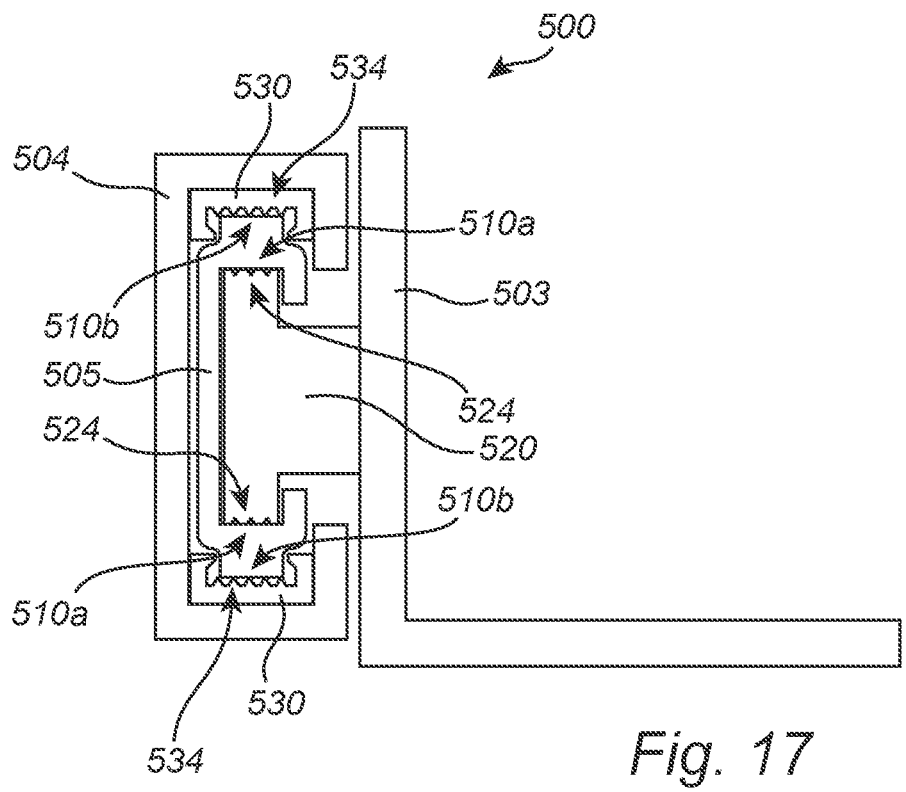
FIG. 17 is a cross-sectional view of a sofa bed sliding system according to a further embodiment.

In FIG. 17 another embodiment of a sliding system 500 is shown in cross-section. This embodiment shares the same concept as the previous embodiment, i.e. that one intermediate member 505 is in sliding connection with two members 503, 504. Hence two sliding interfaces are provided, the first one being realized by the sliding engagement between the intermediate member 505 and the first member 503. The second sliding interface is realized by the sliding engagement between the intermediate member 505, and the second member 504.

For example, the first member 503 may be securely attached, or formed integral with, the seat 3' of the sofa bed 1' while the second member 504 may be securely attached, or formed integral with, the frame structure 10' of the sofa bed 1'.

The first sliding interface is accomplished by providing the first member 503 with at least one sliding member 520. The sliding member 520 may, for example, be made from a polymer as described hereinbefore with reference to the sliding member 120 and extends laterally from the fixed part 503 and it is provided with upper and lower protrusions, e.g. blades 524. The exact number of blades 524 at the upper and lower end of the sliding member 520 could be varied depending on the particular application.

The intermediate member 505 is preferably a metallic member having inwardly directed sliding surfaces 510a and associated low friction slide layers facing the blades 524 of the sliding member 520 of the first member 503. The intermediate member 505 is preferably C-shaped such that the intermediate member 505 may surround the upper and lower blades 524 of the sliding member 520, while lateral movement of the intermediate member 505 relative the sliding member 520 is prevented.

The second sliding interface is accomplished by the intermediate member 505 also being provided with upper and lower sliding surfaces 510b facing outwards. These outwardly directed sliding surfaces 510b are configured to engage with upper and lower sliding members 530 of the second member 504.

The second member 504 is preferably also C-shaped such that it surrounds the intermediate member 505. Inside the second member 504 an upper sliding member 530 is provided to be in contact with the upper outwardly directed sliding surface 510b of the intermediate member 505. Also, inside the second member 504 a lower sliding member 530 is provided to be in contact with the lower outwardly directed sliding surface 510b of the intermediate member 505. The sliding members 530 may, for example, be made from a polymer as described hereinbefore and may not necessarily extend along the entire length of the second member 504, but may be positioned at specific positions along the length of the second member 504. The sliding surfaces 510a, 510b of the intermediate member 505 may have a design similar to that of the sliding surface 110 described hereinbefore with reference to e.g. FIG. 9, and may have the general design described in FIG. 8 with regard to the slide layer 111c.

The sliding members 530 are provided with respective protrusions, e.g., blades 534 so that a sliding engagement is provided in line with the description above of the previous embodiments. Hence, the intermediate member 505 may slide relative the first member 503, and the second member 504 may slide relative the intermediate member 505 so that a comparably long extension may be obtained.

Figure 18A:
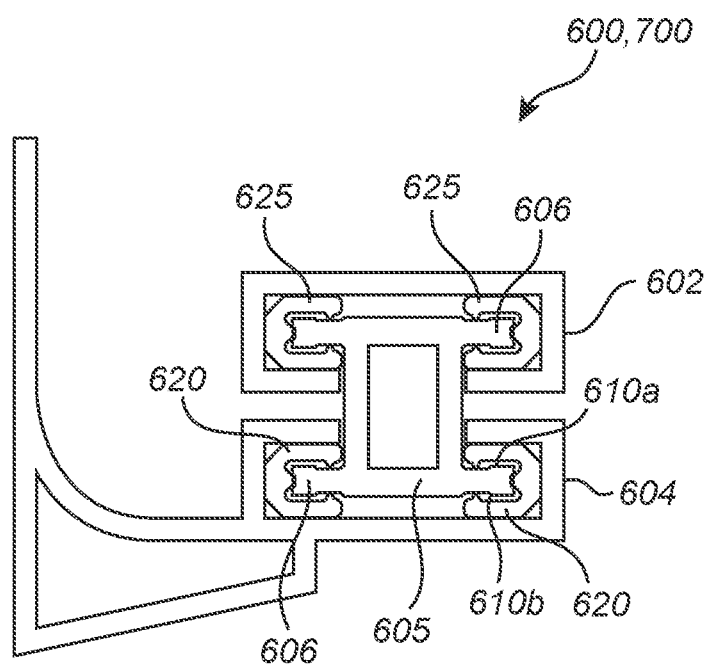
FIG. 18a is a cross-sectional view of a sofa bed sliding system according to various embodiments.

In FIGS. 18a-b other embodiments of sofa bed sliding systems 600, 700 are shown. The two embodiments share the same cross-section, however they operate according to different principles as will be described further on. These two embodiments allow for a full extension of the sofa bed 1'.

As can be seen in FIG. 18a the sofa bed sliding system 600, 700 has a first guiding rail 604 being attachable to, or formed integral with, the frame structure 10', a second guiding rail 602 being attachable to, or formed integral with, the moveable seat 3', and an H-shaped intermediate slide bar 605 arranged in between the first and second guiding rails 604, 602. Pulling out the seat 3' thus provides a sliding movement of the second guiding rail 602 and the intermediate slide bar 605 relative the first guiding rail 604. As for the previous embodiments the sliding system relies on the provision of sliding surfaces, and sliding members 620, 625 engaging with the sliding surfaces.

Now turning to FIGS. 19a-c the operation and exact configuration of the sofa bed sliding system 600 is shown. As can be seen in FIG. 19a the first guiding rail 604 is provided with two sets of sliding members 620 being secured to the first guiding rail 604 at a front position, and at a mid position, respectively. Each sliding member 620 forms a C-shape for receiving a respective horizontal protruding member 606 (see FIG. 18a) of the H-shaped intermediate slide bar 605. For the desired sliding action the sliding member 620 is provided with protrusions extending inwards, and towards upper and lower sliding surfaces 610a, 610b of the respective horizontal protruding member 606 of the intermediate slide bar 605.

Returning to FIG. 19a, the intermediate slide bar 605 may thus be drawn out from the position shown in FIG. 19a due to the sliding action between the intermediate slide bar 605 and the first guiding rail 604.

Similar to this, the second guiding rail 602 is also provided with sliding members 625. The sliding members 625 are provided as a first set, fixedly attached at a rear position of the second guiding rail 602, and a second set, fixedly attached at a mid position of the second guiding rail 602. The sliding members 625 are identical to the sliding members 620 of the first guiding rail 604, and hence the intermediate slide bar 605 also has upper horizontal protruding members 606 for providing upper and lower sliding surfaces, similar to the sliding surfaces 610a-b of the lower protruding members 606, engaging with the sliding members 625. Each of the sliding members 620, 625 may have protrusions, blades, or points of contact according to the above description, for example according to the principles described with reference to FIGS. 7 and 9. Returning to FIG. 19a, the second guiding rail 602 may thus be drawn out from the position shown in FIG. 19a due to the sliding action between the second guiding rail 602 and the intermediate slide bar 605.

In operation, i.e., when pulling out a moveable sofa bed part (i.e. the seat 3') from the frame structure 10', the second guiding rail 602 is drawn out from the frame structure 10' and out from the first guiding rail 604; this pulling action will also cause a sliding action of the intermediate slide bar 605 relative the first guiding rail 604 and relative the second guiding rail 602. This position is shown in FIG. 19b. Upon further pull-out action the second guiding rail 602 will reach its most extended position relative the intermediate slide bar 605, and the intermediate slide bar 605 will reach its most extended position relative the first guiding rail 604. This position is shown in FIG. 19c.

Hence, the sofa bed sliding system 600 described in FIGS. 18a-b and 19a-b has all its sliding surfaces 610a-b located on the intermediate slide bar 605. The first guiding rail 604 holds the sliding members 620 but has no sliding surfaces, and the second guiding rail 602 holds the sliding members 625 but has no sliding surfaces. This provides for a freedom of material choice and surface treatment for the first and second guiding rails 604, 602. The sliding members 620, 625 could have a design similar to that described in FIGS. 21b and 21d herein below, and may include a plug 626 for fixing the respective sliding member 620, 625 in a correct position on the respective guiding rail 604, 602.

In FIGS. 20a-c the operation and exact configuration of the sofa bed sliding system 700 is shown. As can be seen in FIG. 20a the connection between the first guiding rail 604 and the intermediate slide bar 605 involves the first guiding rail 604 being provided with a first set of sliding members 620a and the intermediate slide bar 605 being provided with a second set of sliding members 620b. The first set of sliding members 620a is secured to the first guiding rail 604 at a front position, and the second set of sliding members 620b is fixedly attached to a rear part of the intermediate slide bar 605. Each sliding member 620a-b forms a C-shape for receiving a respective horizontal protruding member 606 (similar to the protruding members 606 illustrated in FIG. 18a) of the H-shaped intermediate slide bar 605. For the desired sliding action the sliding member 620a is provided with protrusions extending inwards, and towards upper and lower sliding surfaces 610a-b (compare FIG. 18a) of the respective horizontal protruding member 606 of the intermediate slide bar 605. However the sliding member 620b is provided with upper and lower protrusions, blades, or points of contact extending outwards to engage with respective sliding surfaces of the first guiding rail 604. The intermediate slide bar 605 may thus be drawn out from the position shown in FIG. 20a due to the sliding action between the intermediate slide bar 605 and the first guiding rail 604.

Similar to this, the connection between the second guiding rail 602 and the intermediate slide bar 605 involves the second guiding rail 602 being provided with a first set of sliding members 625a and the intermediate slide bar 605 being provided with a second set of sliding members 625b. The first set of sliding members 625a is fixedly attached at a rear position of the second guiding rail 602, and the second set of sliding members 625b is fixedly attached at a front part of the intermediate slide bar 605. The sliding members 625a-b are identical to the sliding members 620a-b, meaning that the sliding member 625b is provided with upper and lower protrusions, blades, or points of contact extending outwards to engage with respective sliding surfaces of the second guiding rail 602. The second guiding rail 602 may thus be drawn out from the position shown in FIG. 20a due to the sliding action between the intermediate slide bar 605 and the second guiding rail 602.

In operation, i.e., when pulling out a moveable sofa bed part (i.e. the seat 3') from the frame structure 10', the second guiding rail 602 is drawn out from the frame structure 10' and the first guiding rail 604; this pulling action will also cause a sliding action of the intermediate slide bar 605 relative the first guiding rail 604. This position is shown in FIG. 20b. Upon further pull-out action the second guiding rail 602 will reach its most extended position relative the intermediate slide bar 605, and the intermediate slide bar 605 will reach its most extended position relative the first guiding rail 604. This position is shown in FIG. 20c.

Hence, the sofa bed sliding system 600 described in FIGS. 20a-c has sliding surfaces located on all three of the first guiding rail 604, the intermediate slide bar 605, and the second guiding rail 602. The first guiding rail 604 holds, in fixed manner, the sliding members 620a, the intermediate slide bar 605 holds, in a fixed manner, the sliding members 620b and 625b, and the second guiding rail 602 holds, in a fixed manner, the sliding members 625a.

In FIGS. 21a and 21c the respective sliding member 620b, 625b is shown in more detail. This sliding member 620b, 650b is adapted to be fixed to the intermediate slide bar 605 to provide a low friction contact with sliding surfaces of the first or second guiding rail 604, 602 as explained above. The sliding member 620b, 625b has a recess 630 for receiving the horizontal protruding member 606 of the intermediate slide bar 605, and outwardly directed protrusions 624 for creating the points of contact with the sliding surfaces of the first or second guiding rails 604, 602. The protrusions 624 provide both horizontal and vertical guiding of the intermediate slide bar 605. The recess 630 may be provided with fixing means, such as a stopper 632, for fixing the sliding member 620b, 625b to the protruding member 606 of the intermediate slide bar 605.

In FIGS. 21b and 21d the respective sliding member 620a, 625a is shown. This sliding member 620a, 625a is used to provide a low friction contact with sliding surfaces of the intermediate slide bar 605 as explained above. The sliding member 620a, 625a has a recess 640 for receiving the horizontal protruding member 606 of the intermediate slide bar 605, and inwardly directed protrusions 627 for creating the points of contact with the sliding surfaces of the intermediate slide bar 605. The protrusions 627 provide both horizontal and vertical guiding of the first and second guiding rails 604, 602.

A plug 626 may be provided on the sliding member 620a, 625a being configured to be pressed into a mating hole of the first or second guiding rail 604, 602. This facilitates mounting of the sliding member 620a, 625a to the respective guiding rail 604, 602.

The embodiments described above all share the same common concept of allowing a draw-out functionality of a sofa bed by means of a sliding system having at least one sliding surface, and sliding members interacting with the sliding surface in a low friction sliding manner.

Furthermore there is, according to an embodiment, provided a method for providing a sliding surface 110, 210, 310, 410, 510, 610 for a sliding system 100. 200, 300, 400, 500, 600, 700. In such a method there is provided a sliding surface 110, 210, 310, 410, 510, 610 having a slide surface coated with a lacquer comprising a resin. In order to provide the sliding surface 110, 210, 310, 410, 510, 610 with lowered friction, the lacquer is, at least partly, coated with a lipophilic composition coating. Aspects of the sliding surface 110, 210, 310, 410, 510, 610, the lacquer, and the lipophilic composition coating have been provided herein above and are applicable to this embodiment as well. In applying the lipophilic composition to provide the lipophilic composition coating, the lipophilic composition may firstly be heated, such as melted, to reduce its viscosity. Further, the lipophilic composition may be dissolved in a solvent to facilitate application. After application, the solvent may be evaporated, at least partly. The lipophilic composition to provide the lipophilic composition coating may applied in various ways, such as by spraying, smearing, painting, coating, spreading etc. . . . . .

According to an embodiment, the lipophilic composition is applied by the end-consumer. Thus, the sliding surface 110, 210, 310, 410, 510, 610, the sliding system 100, 200, 300, 400, 500, 600, 700 or arrangements comprising the sliding surface 110, 210, 310, 410, 510, 610 may be provided together with a lipophilic composition to be applied by the end-consumer, i.e. the lacquer is un-coated upon delivery.

Similarly, another embodiment relates to the use of such a lipophilic composition, as described herein as an irreversibly bound lubricant for a sliding surface 110, 210, 310, 410, 510, 610. By "irreversibly bound lubricant" is, according to an embodiment, meant that the lubricant is not removed from the slide surface 110, 210, 310, 410, 510, 610 during normal operation of the sliding system 100, 200, 300, 400, 500, 600, 700 and that it cannot be easily removed using mechanical means, e.g. it cannot be removed by wiping the slide surface with a cloth. As described herein, the sliding surface 110, 210, 310, 410, 510, 610 is coated with a lacquer comprising a resin. Aspects of the sliding surface 110, 210, 310, 410, 510, 610, the lacquer, and the lipophilic composition coating have been provided herein above and are applicable to this embodiment as well.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

EXAMPLES

The following examples are mere examples and should by no means be interpreted to limit the scope of the invention, as the invention is limited only by the accompanying claims.

General

All chemicals were obtained from Sigma-Aldrich. In providing mixtures, e.g. palmitic acid 10 mass % in liquid paraffin, the two compounds (e.g. 3 g palmitic acid and 27 g liquid paraffin) were mixed under heating to melt the mixture. Further, the mixtures were applied to the sliding surface 132, 134, 136, 138 before solidifying.

The test procedure used was based on SS-EN 14882:205. In short, a sled with parallel plastic blades (four in total; two along each longitudinal slide axis) of POM was positioned on an anodized aluminum profile having been anaphoretically coated with an acrylic resin and subsequently heat cured to provide a lacquered slide surface. Aluminum profiles lacquered in this way are for example provided by Sapa Profiler AB, 574 38 Vetlanda, Sweden, and are marketed under the trade name SAPA HM-white, the materials being produced using the Sapa HM-white method which is based on the above referenced Honny method. In the friction measurements, the sled was pulled over the slide bar at a constant speed of 500 mm/min and the force necessary to pull the sled was registered using an Instron 5966 tension testing system. The total weight of the sled corresponds to 10 N. Fresh profiles were used for each lipophilic composition, as the lipophilic compositions cannot be removed once applied. However, the profiles were re-used after the control experiments (no lipophilic compositions applied), washing and ageing, respectively.

Example 1

By using the test procedure described above, the resulting friction from application of various lipophilic compositions to anodized, lacquered aluminum profiles was determined. The resulting dynamic friction, mean value from three test sequences, was registered and compared to the dynamic friction for anodized aluminum profiles provided with a lacquer but not coated with any lipophilic composition (=control). The results are provided in Table 1 and 2 below.

TABLE 1

Fatty acids in liquid paraffin

| Lipophilic composition | Wash | Ageing | Dynamic friction Mean (n = 3) |
|---|---|---|---|
| No (control) | — | — | 0.214 |
| MA5% | — | — | 0.049 |
| MA10% | — | 3 days | 0.046 |
| MA30% | — | — | 0.049 |
| MA10% | Yes | — | 0.041 |
| PA10% | — | 3 days | 0.047 |
| PA10% | Yes | — | 0.042 |
| SA10% | — | 3 days | 0.050 |
| SA10% | Yes | — | 0.044 |
| LP | — | 3 days | 0.053 |
| LP | Yes | — | 0.050 |

MA5%/10%/30% = Myristic acid 5/10/30 mass % in liquid paraffin
PA10% = Palmitic acid 10 mass % in liquid paraffin
SA10% = Stearic acid 10 mass % in liquid paraffin
LP = Liquid paraffin

TABLE 2

Triglycerides in liquid paraffin

| Lipophilic composition | Wash | Ageing | Dynamic friction Mean (n = 3) |
|---|---|---|---|
| No (control) | — | — | 0.214 |
| TM10% | — | — | 0.0510 |
| TM10% | Yes | — | 0.0524 |
| TP10% | — | 3 days | 0.0454 |

TABLE 2-continued

Triglycerides in liquid paraffin

| Lipophilic composition | Wash | Ageing | Dynamic friction Mean (n = 3) |
|---|---|---|---|
| TP10% | — | 6 weeks | 0.0513 |
| TP10% | Yes | — | 0.0440 |
| TS10% | — | — | 0.0524 |
| TS10% | Yes | — | 0.0504 |
| LP | — | — | 0.053 |
| LP | Yes | — | 0.050 |

TM10% = Trimyristate 10 mass % in Liquid paraffin
TP10% = Tripalmitate 10 mass % in Liquid paraffin
TS10% = Tristearate 10 mass % in Liquid paraffin
LP = Liquid paraffin

TABLE 3

Fatty acids in liquid paraffin

| Lipophilic composition | Wash | Dynamic friction Mean (n = 3) |
|---|---|---|
| LP | — | 0.054 |
| LP | Yes | 0.042 |
| LA10% | — | 0.058 |
| LA 10% | Yes | 0.041 |
| LA 30% | — | 0.046 |
| LA 30% | Yes | 0.039 |
| LA 50% | — | 0.048 |
| LA 50% | Yes | 0.036 |
| LA 70% | — | 0.041 |
| LA 70% | Yes | 0.036 |
| Coconut oil | — | 0.033 |
| Coconut oil | Yes | 0.037 |

LA10/30/50/70% = Lauric acid 10/30/50/70 mass % in Liquid paraffin

As can be seen from Table 1 and 2, the resulting dynamic friction was reduced by about 75% by applying a lipophilic compositions to the anodized aluminum profiles, though the initial dynamic friction of the un-coated anodized aluminum profiles was not that high. Furthermore, whereas the dynamic friction remained low and nearly the same for the coated profiles over repeated cycles, the dynamic friction for un-coated anodized aluminum profiles was significantly increased (seizing) already after less than 20 test cycles.

It can also be seen from the above tables 1 and 2 that the tests including fatty acids or triglycerides resulted in a somewhat lower friction compared to pure Liquid paraffin, in particular when the fatty acid is myristic acid or palmitic acid, and when the triglyceride is tripalmitate. Coconut oil, being a mixture of various triglycerides, in which lauric acid is the most common fatty acid residue, provided very low friction (cf. Table 3). Further, neither ageing nor washing (wiping by a wet cloth 6 times, followed by wiping 4 times with a dry cloth) had any significant effect on the dynamic friction.

Example 2

By using the test procedure described above, the resulting friction at various loads (5, 10 and 20 N, respectively) using liquid paraffin as the lipophilic composition coating was determined. Increasing the load did not result in increased friction. On the contrary, the lowest load (5 N) displayed the highest friction (friction value 0.052 (at 5N) vs. friction value 0.045 (at 10 N)/0.046 (at 20 N)).

Example 3

In an additional experiment, a corresponding aluminum bar, but without any lacquer, was used. Use of palmitic acid 10 mass % in liquid paraffin as lubricant on the non-lacquered bar resulted in a dynamic friction of 0.1132, i.e. more than 100% higher than corresponding dynamic friction obtained with the lacquered aluminum bar (cf. Table 1; 0.042 and 0.047, respectively).

Example 4

In additional examples also steel profiles as well as other lacquers were evaluated.

Lacquers: Teknotherm 4400 (Teknos)—wet spray lacquer, Standofleet® (Standox) wet spray lacquer, Powercron® 6200HE (PPG)—cationic epoxy electrocoat, Interpon AF (AkzoNobel)—powder coating, and Alesta® (Axalta)—powder coating.

Profiles: Aluminium (Al), and steel (Fe)

TABLE 4

Coconut oil on aluminum and steel profiles

| Lacquer | Profile | Dynamic friction Mean (n = 3) | Profile | Dynamic friction Mean (n = 3) |
|---|---|---|---|---|
| Teknotherm | Al | 0.040 | Fe | 0.050 |
| Standofleet | Al | 0.045 | Fe | 0.048 |
| Interpon AF | Al | 0.024 | Fe | 0.034 |
| Powercron | Al | 0.021 | Fe | 0.041 |
| Alesta | Al | 0.025 | Fe | 0.038 |

As can be seen from Table 4, the aluminum profiles displayed lower friction than the steel profiles though also the steel profiles displayed a very low friction. Further, whereas some of the alternative lacquers displayed comparable or lower friction than the SAPA HM-white profiles (dynamic friction mean: 0.033), the wet lacquered profiles displayed slightly higher friction. Without being bond to any theory, this may be due to wet lacquered profiles inherently having somewhat thicker lacquer and/or varying thickness of the lacquer. Further, in comparing coconut oil and liquid paraffin (data not shown) it was seen that coconut oil generally provided somewhat lower friction.

Example 5

Tests were also performed in a full-scale test rig using a wardrobe door with a weight of 8.5 kg and using two sliding members 120, 150 and a sliding surface 132, 134, 136, 138. When applying a lipophilic composition coating comprising 100% Liquid paraffin to the lacquer of the sliding surface 132, 134, 136, 138 the wardrobe door could still be moved back and forth without problems and at still a low friction after 500 000 cycles of reciprocation of the wardrobe door. In a comparative test the same equipment was used, but without any lipophilic composition coating being applied on the lacquer. In the latter case the tests had to be stopped already after less than 30 cycles as the test equipment was about to break down due to rapidly increasing friction between the sliding members 120, 150 and the sliding surface 132, 134, 136, 138 (seizing).

It should be realized that the embodiments described above are not limited by the exact number and dimensions described herein. Sofa beds could be provided using even more moveable parts.

Although the present invention has been described above with reference to specific embodiments, it is not intended to be limited to the specific form set forth herein. Rather, the invention is limited only by the accompanying claims.

The invention claimed is:

1. A sofa bed sliding system for a sofa bed, said sliding system forming a connection between a moveable sofa bed part and an associated frame structure, wherein said sliding system comprises at least one sliding surface being coated with a lacquer comprising a resin, wherein said lacquer in turn is at least partly coated with a lipophilic composition coating to provide a slide layer with a lowered friction.

2. The sliding system according to claim 1, wherein the at least one sliding surface is made of aluminum and/or steel.

3. The sliding system according to claim 1, wherein the at least one sliding surface is formed by an insert received in a recess in one of said moveable sofa bed part and said frame structure, and optionally, wherein said part being provided with the recess is made of a material being different from the material of said insert.

4. The sliding system according to claim 3, wherein said material of the part being provided with the recess is a wooden material, a metal material or a plastic material.

5. The sliding system according to claim 1, wherein the at least one sliding surface is integrally formed in one of said moveable sofa bed part and said frame structure.

6. The sliding system according to claim 1, wherein the at least one sliding surface is formed by a member protruding outwards from one of said moveable sofa bed part and said frame structure.

7. The sliding system according to claim 1, wherein said at least one sliding surface is formed by at least one of an upper sliding surface, a lower sliding surface, and a distal sliding surface, or any combination thereof.

8. The sliding system according to claim 1, wherein the at least one sliding surface is formed by an intermediate slide bar providing a sliding movement in relation to at least one guiding rail, said guiding rail being connected to one of said moveable sofa bed part and said frame structure.

9. The sliding system according to claim 1, wherein the thickness of the lacquer coated on the sliding surface is 100 μm or less.

10. The sliding system according to claim 1, wherein the at least one sliding surface is formed by an aluminum member, wherein the surface layer has been electrophoretically coated with a resin, and subsequently heat cured to form the lacquer coated on the sliding surface.

11. The sliding system according to claim 1, wherein the lipophilic composition coating comprises compounds comprising C6 to C40 non-aromatic hydrocarbyl groups
and/or wherein the lipophilic composition coating present on the lacquer comprises at least 25 wt. %.

12. The sliding system according to claim 1, wherein the lipophilic composition coating present on the lacquer comprises triglycerides and/or fatty acids.

13. The sliding system according to claim 1, further comprising at least one sliding member for engagement with said at least one sliding surface, and wherein an interface between the at least one sliding surface and the at least one sliding member forms a linear plain bearing to allow for linear movement of the at least one sliding member along the longitudinal axis of the at least one sliding surface, and/or
wherein at least the part of said at least one sliding member being in contact with the at least one sliding surface is made of a plastic comprising a polymer selected from the group of polymers consisting of polyoxymethylenes (POM), polyesters, polyamides (PA), polyvinyl chloride (PVC), polyphenylene sulfide (PPS), polyaryletherketone (PAEK), and Polytetrafluoroethylene (PTFE).

14. The sliding system according to claim 13, wherein said at least one sliding member is in its entirety made from a plastic.

15. The sliding system according to claim 13, wherein the part of said at least one sliding member to slide over the at least one sliding surface is configured as at least one blade extending in the sliding direction, and/or wherein the at least one sliding member comprises at least one individual contact point in contact with the sliding, the contact area of each individual contact point being less than 3 mm$_2$.

16. The sliding system according to claim 13, further comprising a first guiding rail being attached to the moveable sofa bed part, and a second guiding rail being attached to the frame structure.

17. The sliding system according to claim 13, wherein a guiding rail being provided with the at least one sliding surface is connected to one of said moveable sofa bed part and said frame structure, the other of said moveable sofa bed part and said frame structure being provided with the at least one sliding member, wherein the guiding rail is provided with a groove receiving the at least one member, the at least one sliding surface being provided inside said groove.

18. A sofa bed, comprising at least one sofa bed sliding system according to claim 1.

19. The sofa bed according to claim 18, comprising the at least one sliding surface connected to one of said moveable sofa bed part and said frame structure and at least one sliding member connected to the other one of said moveable sofa bed part and said frame structure, and wherein an interface between the at least one sliding surface the at least one sliding member forms a linear plain bearing to allow for movement of said sofa bed part relative to said frame structure.

20. The sofa bed according to claim 18, comprising a first guiding rail being connected to the moveable sofa bed part, and a second guiding rail) being connected to the frame structure.

21. The sofa bed according to claim 18, comprising a first sliding system supporting one lateral side of the moveable sofa bed part, and a second sliding system supporting the opposite lateral side of the moveable sofa bed part.

* * * * *